(12) United States Patent
Goto et al.

(10) Patent No.: US 8,402,332 B2
(45) Date of Patent: Mar. 19, 2013

(54) RECEPTION APPARATUS, RECEPTION METHOD AND RECEPTION SYSTEM

(75) Inventors: Yuken Goto, Tokyo (JP); Kenichi Kobayashi, Tokyo (JP); Kentaro Nakahara, Tokyo (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 12/899,773

(22) Filed: Oct. 7, 2010

(65) Prior Publication Data

US 2011/0099445 A1  Apr. 28, 2011

(30) Foreign Application Priority Data

Oct. 28, 2009 (JP) ................................. 2009-247756

(51) Int. Cl.
*G06F 11/30* (2006.01)
*G08C 25/00* (2006.01)
*H03M 13/00* (2006.01)

(52) U.S. Cl. ........ 714/746; 375/226; 375/303; 375/343; 370/208; 369/47.48; 348/725

(58) Field of Classification Search .................. 714/746; 375/303, 343, 226; 370/208; 369/47.48; 348/725

See application file for complete search history.

(56) References Cited

U.S. PATENT DOCUMENTS

2009/0225822 A1\* 9/2009 Tupala et al. ................. 375/226

FOREIGN PATENT DOCUMENTS

EP  1 367 742 A2  12/2003

OTHER PUBLICATIONS

Digital Video Broadcasting (DVB); Frame Structure Channel Coding and Modulation for a Second Generation Digital Terrestrial Television Broadcasting System (DVB-T2), DVB BlueBook A122 Rev.1, Jun. 2010, 179 pages.

The Extended European Search Report issued Feb. 3, 2012 in Europe Application No. / Patent No. 10188173.8-1525 / 2317716.

Pandja R., "Inroduction to WLLs: Application and Deployment for Fixed and Broadband Services", ("Classification of Radio Systems"), Willey-IEEE, XP002668028, Dec. 15, 2003, p. 17.

DVB Organization: "Digital Video Broadcasting (DVB)", Implementation guidelines for a second generation digital terrestrial television broadcasting system (DVB-T2), draft ETSI TR 102 831 V0.9.12 (Oct. 2009), (Technical Report), C/O EBU-17A Ancienne Route, (XP017817722), Oct. 16, 2009, 201 pages.

\* cited by examiner

*Primary Examiner* — Guy Lamarre

(74) *Attorney, Agent, or Firm* — Oblon, Spivak, McClelland, Maier & Neustadt, L.L.P.

(57) ABSTRACT

Disclosed herein is a reception apparatus, including an acquisition section adapted to receive a signal which includes at least one of a first signal and a second signal which have different structures from each other except that the first and second signals have a preamble signal and acquire the preamble signal from the received signal; a detection section adapted to detect a value for correcting the signal using the signal; and a correction section adapted to correct, if it is decided based on the preamble signal acquired by the acquisition section that the signal is the first signal, the signal using the value detected by the detection section.

16 Claims, 23 Drawing Sheets

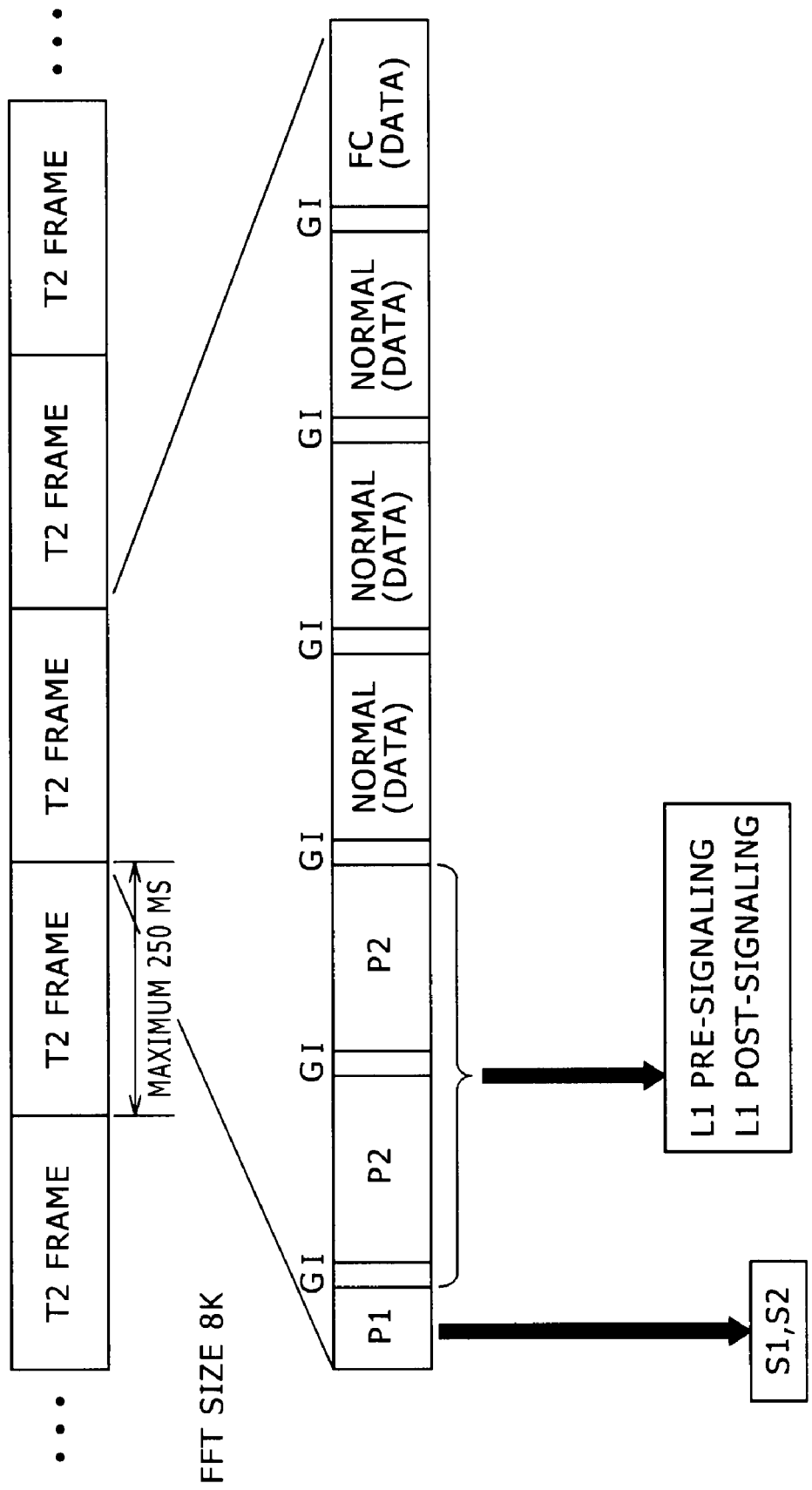

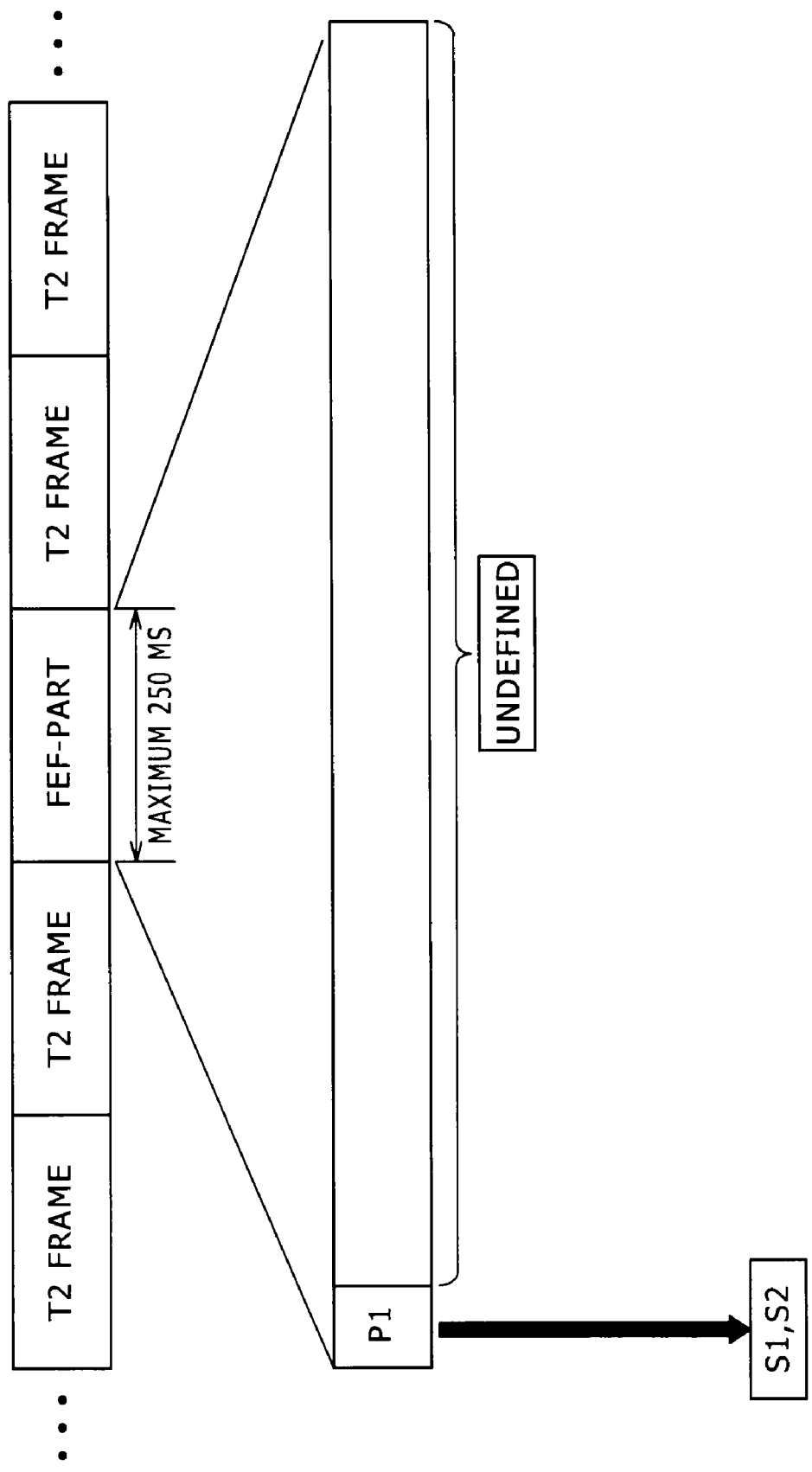

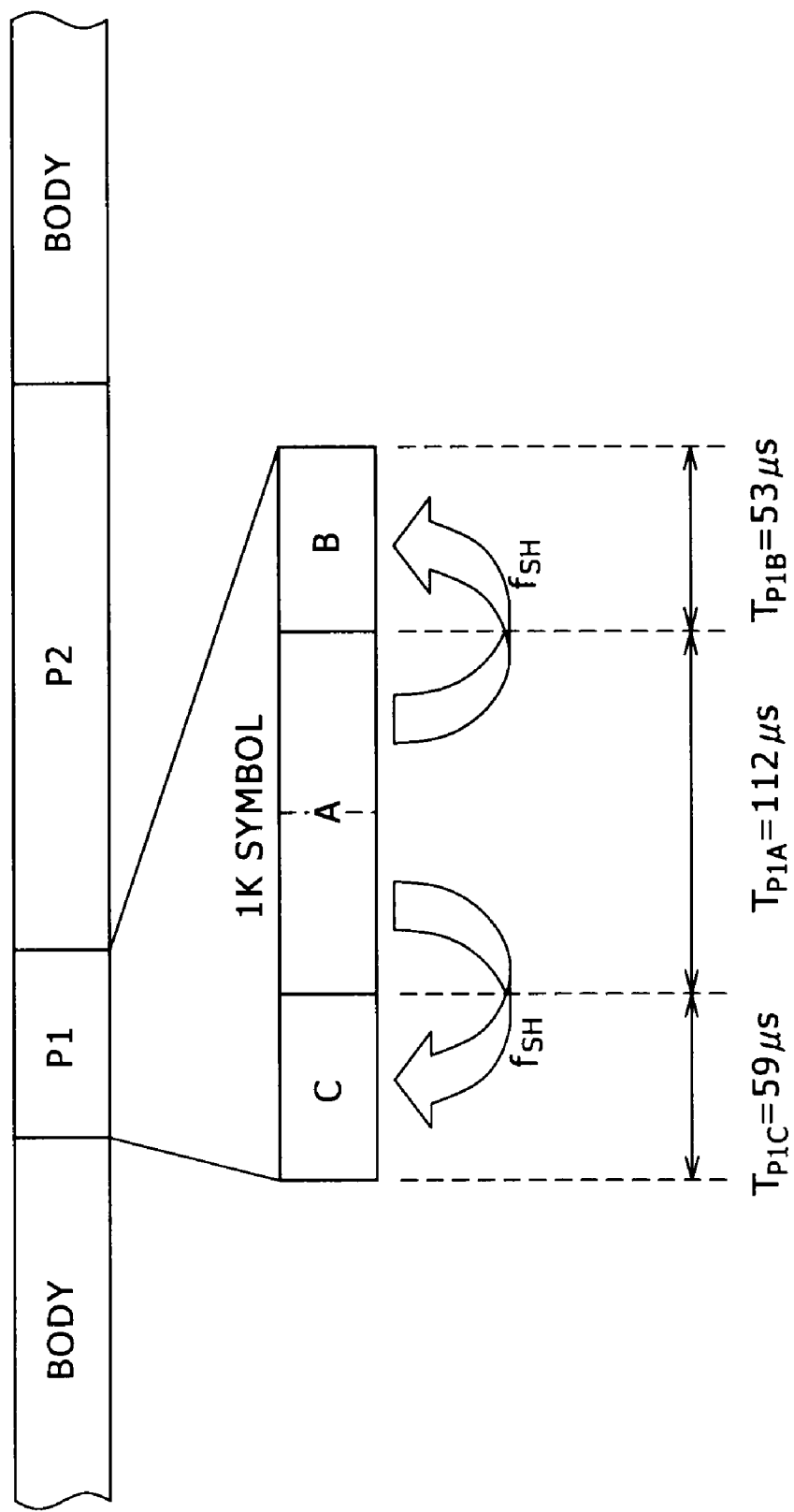

FIG.5A

| S1 | PREAMBLE FORMAT/ P2 TYPE | DESCRIPTION |
|---|---|---|
| 000 | T2_SISO | THE PREAMBLE IS A T2 PREAMBLE AND THE P2 PART IS TRANSMITTED IN ITS SISO FORMAT |
| 001 | T2_MISO | THE PREAMBLE IS A T2 PREAMBLE AND THE P2 PART IS TRANSMITTED IN ITS MISO FORMAT |
| 010 | NON-T2 PREAMBLE | |
| 011<br>100<br>101<br>110<br>111 | RESERVED | THESE COMBINATIONS MAY BE USED FOR FUTURE SYSTEMS, INCLUDING A SYSTEM CONTAINING BOTH T2-FRAMES AND FEF PARTS, AS WELL AS FUTURE SYSTEMS NOT DEFINED IN THE PRESENT DOCUMENT |

FIG.5B

| S1 | S2 | MEANING | DESCRIPTION |
|---|---|---|---|
| XXX | XXX0 | NOT MIXED | ALL PREAMBLES IN THE CURRENT TRANSMISSION ARE OF THE SAME TYPE AS THIS PREAMBLE. |
| XXX | XXX1 | MIXED | PREAMBLES OF DIFFERENT TYPES ARE TRANSMITTED. |

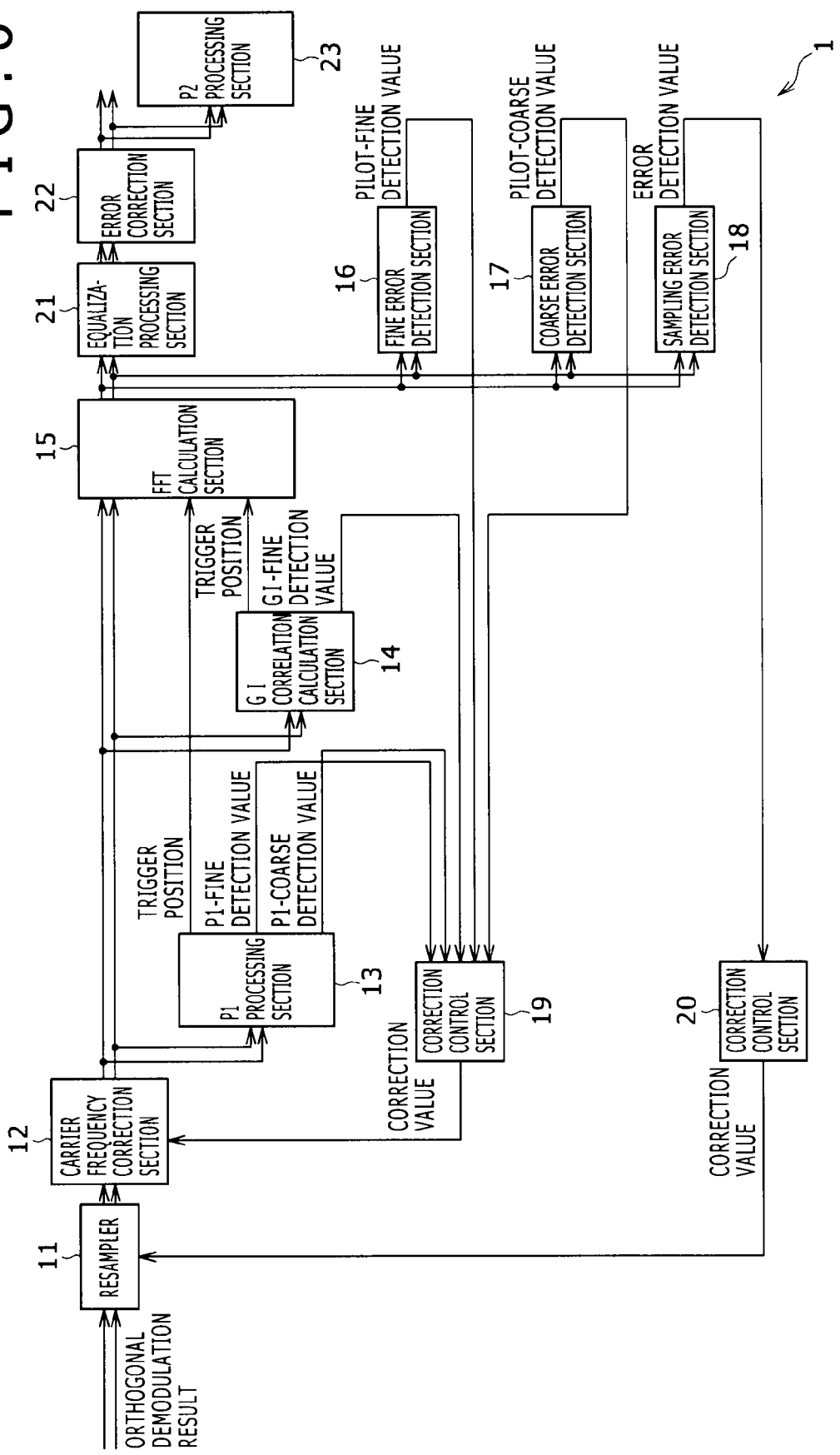

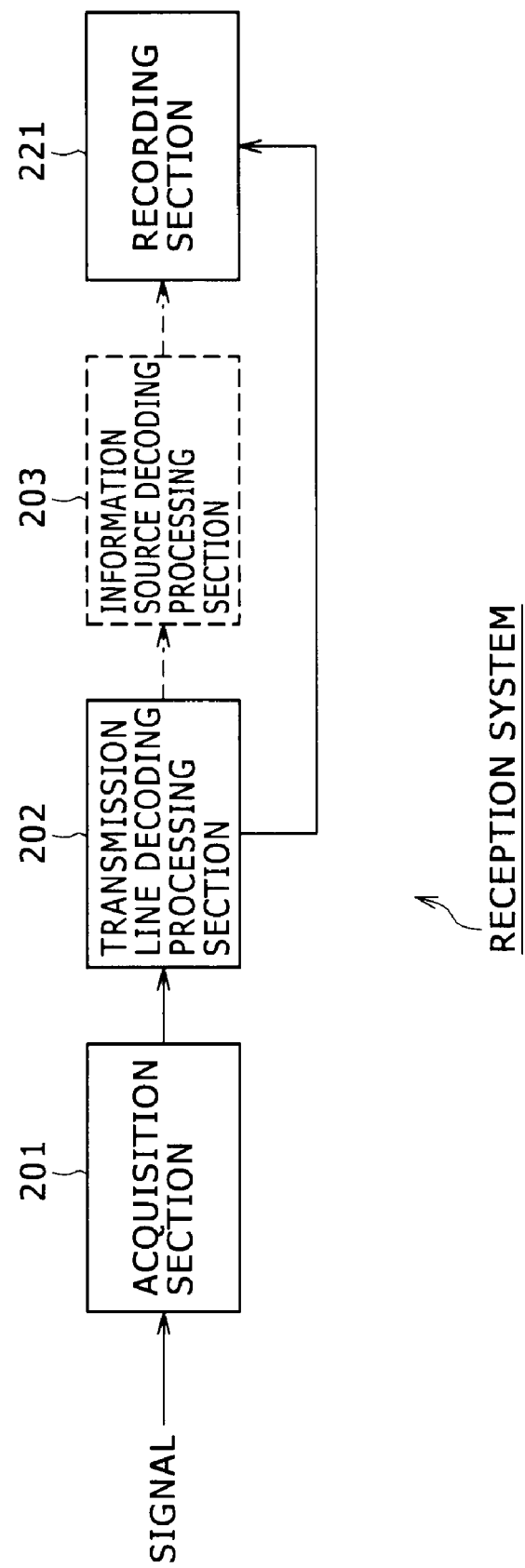

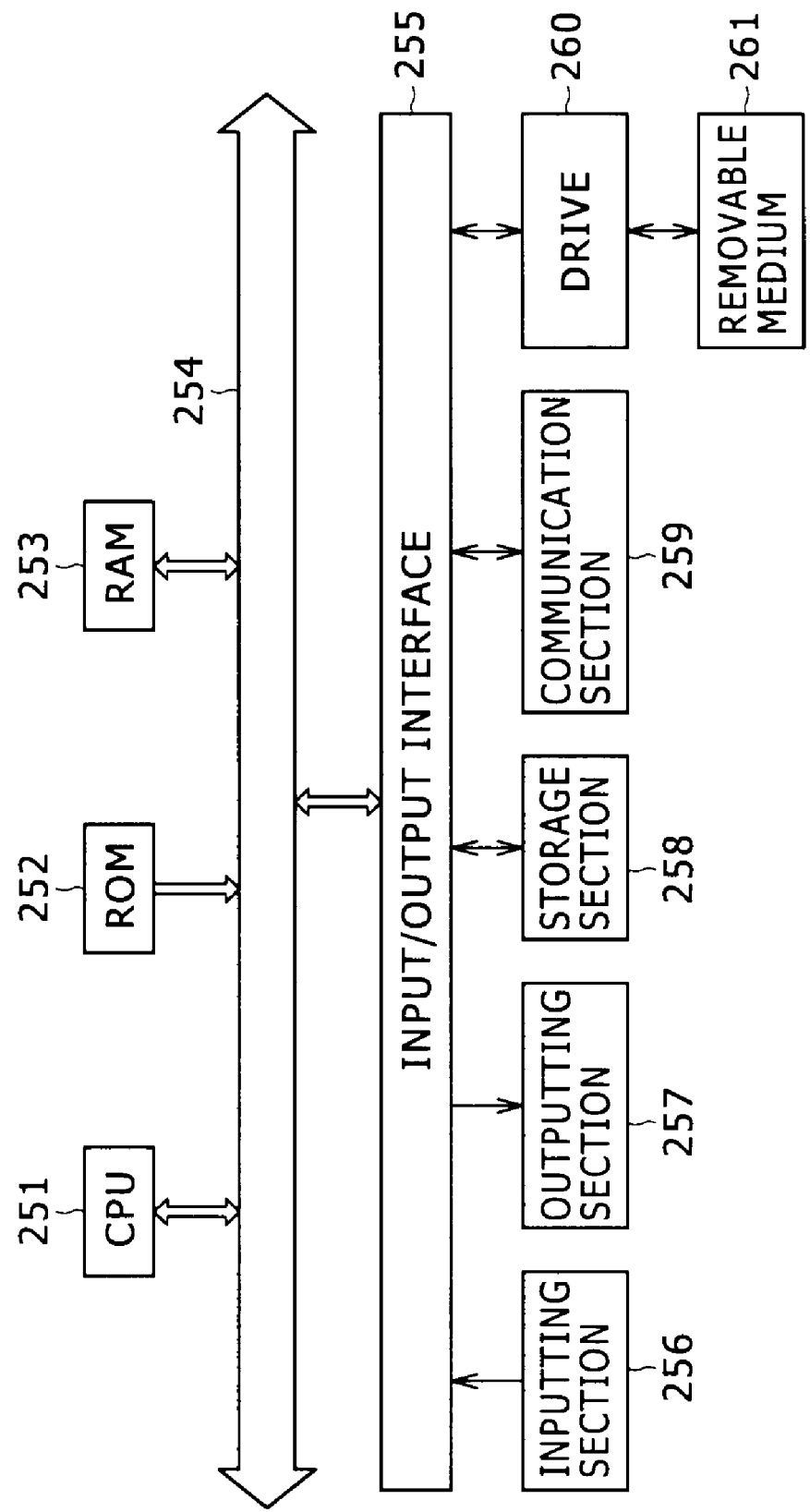

RECEPTION APPARATUS, RECEPTION METHOD AND RECEPTION SYSTEM

BACKGROUND OF THE INVENTION

1. Field of the Invention

This invention relates to a reception apparatus, a reception method and a reception system, and particularly to a reception apparatus, a reception method and a reception system which can implement improvement of the stability and the noise-resisting performance upon starting of reception even where a signal which includes a signal other than a T2 frame is to be received.

2. Description of the Related Art

In terrestrial digital broadcasting and so forth, orthogonal frequency division multiplexing (OFDM) is adopted as a modulation method for data.

In the OFDM, a large number of orthogonal subcarriers are provided in a transmission band, and digital modulation such as phase shift keying (PSK) or quadrature amplitude modulation (QAM) wherein data are allocated to the amplitude or the phase of the subcarriers is carried out.

In the OFDM, since data allocation to a plurality of subcarriers is carried out, modulation can be carried out by IFFT (Inverse Fast Fourier Transform) operation by which inverse Fourier transform is carried out. Further, demodulation of an OFDM signal obtained as a result of the modulation can be carried out by FFT (Fast Fourier Transform) operation by which Fourier transform is carried out.

Accordingly, a transmission apparatus which transmits an OFDM signal can be configured using a circuit which carries out IFFT operation, and a reception apparatus which receives an OFDM signal can be configured using a circuit which carries out FFT operation.

Further, in the OFDM, data are transmitted in a unit called OFDM symbol.

An OFDM symbol is generally configured from an effective symbol which is a signal period within which IFFT is carried out upon modulation, and a guard interval in which a waveform of part of a rear half of the effective symbol is copied as it is at the top of the effective symbol. By providing the guard interval at the top of the OFDM symbol in this manner, the resisting property to multipath noise can be improved.

Further, in the OFDM, a pilot signal which is a known signal, that is, a signal known to the reception apparatus side, is discretely inserted in the time direction or the frequency direction, and a reception side utilizes the pilot signal for synchronization, estimation of a transmission line characteristic and so forth.

It is to be noted that, according to terrestrial digital broadcasting standards which adopt the OFDM, a unit called frame, that is, OFDM transmission frame, configured from a plurality of OFDM symbols, is defined, and transmission of data is carried out in a unit of a frame.

The reception apparatus for receiving such an OFDM signal as described above uses a carrier of the OFDM signal to carry out digital orthogonal demodulation of the OFDM signal.

However, generally the carrier of the OFDM signal used for digital orthogonal demodulation by the reception apparatus does not coincide with the carrier of an OFDM signal used in the transmission apparatus from which the OFDM signal is transmitted but includes some errors. In other words, the frequency of the carrier of the OFDM signal used for digital orthogonal demodulation is displaced or offset from the center frequency of an IF (Intermediate Frequency) signal of the OFDM signal received by the reception apparatus.

Therefore, the reception apparatus carries out a carrier displacement amount detection process of detecting a carrier displacement or offset amount which is an error of the carrier of the OFDM signal used for digital orthogonal demodulation and a correction process, that is, an offset correction process of correcting the OFDM signal in accordance with the carrier displacement amount so as to eliminate the carrier displacement amount.

As one of standards for terrestrial digital broadcasting which adopt OFDM having such characteristics as described above, the DVB-T2 standards, which are second generation European digital broadcasting standards, are available. The DVB-T2 standards are disclosed in "Frame structure channel coding and modulation for a second generation digital terrestrial television broadcasting system (DVB-T2)," DVB Document A122, June 2008 (hereinafter referred to as Non-Patent Document 1).

In the DVB-T2, data are transmitted in a unit of a transmission frame called T2 frame. Further, in the DVB-T2, a signal called FEF (Future Extension Frame) having a structure different from that of the T2 frame is multiplexed and transmitted with the T2 frame.

FIG. 1 illustrates a frame configuration of the DVB-T2.

Referring to FIG. 1, in the DVB-T2, a T2 frame and a FEF part are multiplexed for transmission. However, the FEF part is inserted only where this is required.

In what manner the FEF part is inserted is decided uniquely from the value of the FEF interval and the FEF length. The values of them are included in the L1 pre-signaling of a T2 frame of FIG. 2 hereinafter described. For example, where the value of the FEF interval is n and the value of the FEF length is m, one FEF part is inserted in n T2 frames, and the length of the FEF part is m samples. In other words, A=B=C=FEF interval (n).

FIG. 2 illustrates the format of a T2 frame.

Referring to FIG. 2, the T2 frame includes a P1 symbol, P2 symbols, and symbols called Normal and a symbol called FC (Frame Closing) (both of which are data symbols), disposed in this order.

It is to be noted that a portion denoted by GI in FIG. 2 represents the guard interval in an OFDM symbol, and the P1 symbol does not have the GI.

The P1 symbol is a symbol for transmitting the P1 signaling. The P1 symbol includes transmission parameters S1 and S2. The transmission parameters S1 and S2 represent in which one of methods of the SISO (Single Input Single Output (meaning one transmitting and one receiving antenna)) and the MISO (Multiple Input, Single Output (meaning multiple transmitting antennas but one receiving antenna) the P2 symbols are to be transmitted, the FFT size when FFT calculation of the P2 symbols is to be carried out, that is, the number of samples or symbols of an object of one cycle of FFT calculation, and so forth.

The P2 symbols are symbols for transmitting the L1 pre-signaling and the L1-post signaling. Further, since the P2 symbols include a greater number of pilots than ordinary symbols, utilization of the P2 symbols can raise the accuracy in various error detections which utilize pilots in comparison that of ordinary symbols.

The L1 pre-signaling includes information necessary to carry out decoding of the L1 post-signaling. The L1 post-signaling includes information necessary for accessing to a layer pipe of a physical layer.

Here, the L1 pre-signaling includes a pilot pattern (PP) representative of arrangement of a pilot signal regarding in which symbol or subcarrier a pilot signal which is a known signal is included, presence or absence (BWT_EXT) of extension of a transmission band for transmitting the OFDM signal, a number (NDSYM) of OFDM symbols included in one T2 frame, and so forth. The information included in the L1 pre-signaling is necessary for demodulation of the symbols of the data including the FC.

The L1 pre-signaling further includes information which represents such FEF sections as the FEF length and the FEF interval shown in FIG. 1 more accurately, and associated information representative of the type of the FEF such as the FEF_Type.

FIG. 3 illustrates a format of the FEF part. Referring to FIG. 3, the FEF part is undefined fully except that the maximum length thereof is 250 ms which is equal to that of the T2 frame and that the P1 symbol is placed at the top thereof. For example, also the average signal power may be different from that in the section of a T2 frame or no signal may be included. In other words, since it is not known whether or not the FEF part has a frame configuration, in the DVB-T2, the part is called FEF part. It is to be noted that, in the following description, the FEF part is sometimes referred to also simply as FEF.

Accordingly, although a reception apparatus at present need not acquire information included in the FEF except the P1 symbol, it has to detect that the FEF is inserted and operate such that reception of T2 frames is not influenced by the FEF.

In particular, the reception apparatus has to carry out P1 detection and estimate a section in which the FEF is inserted based on information included in the P1 and then operate such that a signal in the interval may not have an influence on ordinary reception of T2 frames for a period of time after reception is started until the L1 pre-signaling is acquired.

FIG. 4 shows a configuration of the P1 symbol.

Referring to FIG. 4, the P1 symbol intended in the DVB-T2 standards has the following ends:

a. The reception apparatus is enabled to decide early that the signal being received is a signal of the DVB-T2 standards;

b. The reception apparatus is enabled to decide that the preamble signal itself is the preamble signal of a frame of the DVB-T2 standards;

c. A transmission parameter necessary to start demodulation is transmitted; and d. The reception apparatus can carry out position detection of a frame and correction of errors of the carrier.

As seen from FIG. 4, the P1 symbol has 1k (=1,024) symbols as effective symbols. The P1 symbol is structured such that a signal C obtained by frequency shifting part of the effective symbols A on the top side by a frequency $f_{SH}$ is copied on the front side of the effective symbols A and a signal B obtained by frequency shifting the remaining part of the effective symbols A by the frequency $f_{SH}$ is copied on the rear side of the effective symbol A. The frequency shift makes it less likely to detect an interfering signal as a P1 symbol in error on the standards.

The reception apparatus utilizes the fact that the P1 symbol includes a copy of part of the data thereof to determine a correlation value for each section to detect the P1 symbol. The detection of the P1 symbol is carried out, for example, upon initial scanning for checking which channel is used to transmit a signal of the DVB-T2 standards.

For the P1 symbol detected in this manner, fixed processes such as frequency correction, FFT calculation, CDS (Carrier Distribution Sequence) correlation calculation, scramble processing and DBPSK demodulation are carried out to decode the S1 and the S2 included in the P1 symbol.

FIGS. 5A and 5B illustrate transmission parameters of the S1 and the S2 included in the P1 symbol. It is to be noted that, in FIGS. 5A and 5B, X represents 0 or 1. The S1 is represented by a value of 3 bits as seen in FIG. 5A, and the S2 is represented by a value of 4 bits as seen in FIG. 5B.

When the S1 indicates 000, it represents that the received P1 symbol indicates a T2 frame of the SISO. When the S1 indicates 001, it represents that the received P1 symbol indicates a T2 frame of the MISO. When the S1 indicates 010, it represents that the received P1 symbol is not a preamble of a T2 frame. When the S1 indicates one of 011, 100, 101, 110 and 111, it represents the Reserved. In short, when the S1 indicates any other than 000 and 001, the received P1 symbol indicates a signal (FEF) with which the reception apparatus at present which only receives a T2 frame is not compatible.

When the LSB (Least Significant Bit) of the S2 is 0, it represents that the signal received is "Not Mixed," but when the LSB of the S2 is 1, it represents that the signal received is "Mixed." Here, the Not Mixed represents that the P1 of the signal being currently received is continuously same, and the Mixed represents that the P1 of the signal being currently received is different in each different frame and includes also the preamble of the T2 frame.

Accordingly, if the S1 and the S2 of a P1 symbol received at a certain point of time are checked, then the reception signal corresponds to one of the following patterns without fail:

A. A T2 frame is being received (S1: T2, S2: Not Mixed);

B. From within a multiplexed signal of T2 frames and FEFs, a T2 frame is being received (S1: T2, S2: Mixed);

C. Some other than a T2 frame is being received (S1: Not T2, S2: Not Mixed); and D. From within a multiplexed signal of T2 frames and FEFs, a FEF is being received (S1: Not T2, S2: Mixed).

In short, by checking the S1 and the S2 of the P1 symbol, discrimination between the T2 frame and the FEF (T2/FEF) can be carried out.

Example of the Configuration of the Reception Apparatus

FIG. 6 is a block diagram showing an example of a configuration of a known reception apparatus.

Referring to FIG. 6, the reception apparatus 1 shown includes a resampler 11, a carrier frequency correction section 12, a P1 processing section 13, a GI correlation calculation section 14, a FFT calculation section 15, a fine error detection section 16, a coarse error detection section 17, a sampling error detection section 18, a correction control section 19, another correction control section 20, an equalization processing section 21, an error correction section 22 and a P2 processing section 23.

To an orthogonal demodulation section not shown of the reception apparatus 1, an IF (Intermediate Frequency) signal of an OFDM signal transmitted from a transmission apparatus is inputted. The orthogonal demodulation apparatus uses a carrier of a predetermined frequency, that is, of a carrier frequency, ideally a carrier same as that used in the transmission apparatus, and a signal orthogonal to the carrier to digitally orthogonally demodulate an OFDM signal inputted thereto. The orthogonal demodulation apparatus outputs an OFDM signal of a baseband obtained as a result of the digital orthogonal demodulation as a demodulation result.

The signal outputted as the demodulation result is a signal of a time domain before FFT calculation by the FFT calculation section 15 hereinafter described is carried out therefor, that is, a signal of a time domain immediately after a symbol, which is data transmitted by one subcarrier, on an IQ constellation is IFFT calculated on the transmission side.

The OFDM time domain signal outputted as the demodulation result is supplied to and converted into a digital signal by an A/D conversion section not shown and is then outputted to the resampler 11. The OFDM time domain signal is a complex signal represented by a complex number which includes a real axis component, that is, an I (In Phase) component, and an imaginary axis component, that is, a Q (Quadrature Phase) component. Therefore, circuit blocks to which a complex signal is inputted following the resampler 11 are indicated by two arrow marks. The resampler 11 finely adjusts the demodulation result in the form of a digital signal so that the sampling rate is synchronized with the clock of the transmission apparatus.

The carrier frequency correction section 12 carries out carrier frequency correction for the signal outputted from the resampler 11. A signal outputted from the carrier frequency correction section 12 is inputted to the P1 processing section 13, GI correlation calculation section 14 and FFT calculation section 15.

The P1 processing section 13 is a functional block which acquires the signal outputted from the carrier frequency correction section 12 and corresponding to an OFDM symbol of the P1 and carries out detection of a trigger position, a fine offset and a coarse offset and so forth. Further, the P1 processing section 13 can discriminate whether or not a signal being currently received is a T2 frame. A signal representative of the detected trigger signal is outputted to the FFT calculation section 15, and a detection value of the fine offset, also referred to as fine detection value, and a detection value of the coarse offset, also called coarse detection value, are outputted to the correction control section 19.

Here, the fine offset is an offset within an OFDM subcarrier interval which is fine while the coarse offset is an offset equal to an OFDM subcarrier interval which is coarse. In particular, correction with the fine offset is "finer" than that with the coarse offset, and correction with the coarse offset is "coarser" than that with the fine offset.

The GI correlation calculation section 14 acquires guard intervals from the signal outputted from the carrier frequency correction section 12 and uses the correlation of the guard intervals to detect the trigger position and the fine offset. A signal representative of the trigger position is outputted to the FFT calculation section 15, and the fine detection value is outputted to the correction control section 19.

The FFT calculation section 15 is a functional block which carries out FFT calculation for OFDM symbols based on signals supplied from the P1 processing section 13 and the GI correlation calculation section 14 and each representative of a trigger position. The FFT calculation section 15 extracts sample values of an OFDM time domain signal corresponding to the FFT size from the OFDM time domain signal in accordance with the trigger positions and carries out FFT calculation.

Consequently, from those symbols which configure one OFDM symbol included in the OFDM time domain signal, symbols of the effective symbol length with the symbols of the guard intervals removed are extracted as an OFDM time domain signal of the FFT interval and used for FFT calculation.

By the FFT calculation of the OFDM time domain signal by the FFT calculation section 15, the information transmitted from the subcarrier, that is, an OFDM signal representative of the symbols on the IQ constellation is obtained.

It is to be noted that the OFDM signal obtained by the FFT calculation of the OFDM time domain signal is a signal in a frequency domain and is hereinafter referred to also as OFDM frequency domain signal.

A result of the calculation of the FFT calculation section 15 is outputted to the equalization processing section 21, fine error detection section 16, coarse error detection section 17 and sampling error detection section 18.

The fine error detection section 16 uses an inter-symbol phase difference of OFDM pilots of the OFDM frequency domain signal obtained by the FFT calculation to newly detect a fine offset, and outputs a fine detection value to the correction control section 19.

The coarse error detection section 17 uses the fact that the modulation pattern of the OFDM pilots of the OFDM frequency domain signal obtained by the FFT calculation is known to newly detect a coarse offset, and outputs a coarse detection value to the correction control section 19.

It is to be noted that the fine detection value detected by the P1 processing section 13 is hereinafter referred to as P1-fine detection value, and the coarse detection value detected by the P1 processing section 13 is hereinafter referred to as P1-coarse detection value. The fine detection value detected by the GI correlation calculation section 14 is hereinafter referred to as GI-fine detection value. Further, the fine detection value detected by the fine error detection section 16 is hereinafter referred to as pilot-fine detection value, and the coarse detection value detected by the coarse error detection section 17 is hereinafter referred to as pilot-coarse detection value.

The sampling error detection section 18 detects a sampling error based on the OFDM frequency domain signal obtained by the FFT calculation and outputs an error detection value to the correction control section 20.

The correction control section 19 corrects an error of the P1-fine detection value from the P1 processing section 13 based on the GI-fine detection value from the GI correlation calculation section 14 and the pilot-fine detection value from the fine error detection section 16. Further, the correction control section 19 corrects an error of the P1-coarse detection value from the P1 processing section 13 based on the pilot-coarse detection value from the coarse error detection section 17. Then, the correction control section 19 generates a carrier frequency correction value by the correction of the detection values and outputs the carrier frequency correction value to the carrier frequency correction section 12.

The correction control section 20 controls operation of the resampler 11 based on the error detection value from the sampling error detection section 18.

The equalization processing section 21 carries out an equalization process in accordance with a characteristic of a transmission channel based on the pilot symbols included in the OFDM symbols of the OFDM frequency domain signal. For example, the equalization processing section 21 can carry out equalization of the signal transmitted thereto by carrying out complex division of the signal after the FFT calculation by an estimated transmission line characteristic. The signal equalized by the equalization processing section 21 is outputted to the error correction section 22.

The error correction section 22 carries out a deinterleave process for a signal interleaved by the transmission side and outputs a resulting signal to the P2 processing section 23 and a circuit on the succeeding stage.

The P2 processing section 23 acquires a signal corresponding to an OFDM symbol of the P2 and carries out decoding of the L1 pre-signaling and the L1 post-signaling. Information of the L1 pre-signaling and the L1 post-signaling obtained by the decoding is used for demodulation of symbols of data and so forth.

SUMMARY OF THE INVENTION

Where a reception apparatus starts demodulation and the P1 symbol indicates the "Mixed," the signal being received includes one FEF and n T2 frames sent alternately thereto.

Although the reception apparatus should ignore the FEF interval, to this end, it is necessary to carry out, every time the P1 is detected, decision of whether or not the signal being currently received is a FEF upon starting of demodulation. Although this decision is carried out by reading information of the S1 included in the P1 symbol, in order to read the information of the S1, such fixed processes as described hereinabove are required and a fixed period of time is required.

In particular, in the reception apparatus, detection of the P1 symbol indicative of the top position of a T2 frame or a FEF can be carried out comparatively early. However, since a fixed period of time is required for the decision of whether the frame succeeding the P1 symbol is a T2 frame or a FEF after the P1 symbol is detected, the state in which it is unknown that the succeeding frame is a T2 frame or a FEF continues. During this period of time, various operations to be carried out by the reception apparatus are restricted.

For example, in the reception apparatus 1, detection values detected by the GI correlation calculation section 14, fine error detection section 16, coarse error detection section 17, sampling error detection section 18 and so forth are fed back to the correction control section 19 and the correction control section 20 to carry out correction.

However, if feedback correction is carried out when a signal which is not a T2 frame, which is a normal OFDM signal, like a FEF is inputted, then later input signals are received but not as normal signals and the feedback loop fails, resulting in the possibility that later demodulation may become difficult.

Further, the carrier frequency correction and the sampling frequency correction carried out using detection values obtained by the GI correlation calculation section 14, fine error detection section 16, coarse error detection section 17, sampling error detection section 18 and so forth are premised on an assumption that a T2 frame, that is, a normal OFDM signal, is inputted. Accordingly, if it cannot be discriminated whether the signal being currently received is a T2 frame or a FEF, then actually it is difficult to carry out such correction as described above.

The period of time required before the decision of T2/FEF is completed, that is, the period of time before the S1 and the S2 are obtained, relies upon a mounting method and the range within which coarse carrier frequency correction is carried out using a P1 symbol. For example, where the mounting method uses a small circuit scale or where the range within which the coarse carrier frequency correction is carried out is taken wide, a long period of time is required before the decision of T2/FEF is completed.

In this instance, even if it is intended to carry out correction using a pilot of more than one P2 symbol which exist at the top of a T2 frame, there is the possibility that the section of the P2 symbol may have passed at a point of time at which the decision of T2/FEF is completed. This disables the correction. In other words, where the time required before the decision of T2/FEF is completed is long, it is difficult to carry out a process using the P2, and as a result, it is difficult to normally decode the data included in the T2 frame.

Therefore, it is desirable to provide a reception apparatus, a reception method and a reception system which can implement improvement of the stability and the noise-resisting performance upon starting of reception even where a signal which includes a signal other than a T2 frame is to be received.

According to a first embodiment of the present invention, there is provided a reception apparatus including first acquisition means for receiving a signal which includes at least one of a first signal and a second signal which have different structures from each other except that the first and second signals have a preamble signal and acquiring the preamble signal from the received signal, detection means for detecting a value for correcting the signal using the signal, and correction means for correcting, if it is decided based on the preamble signal acquired by the first acquisition means that the signal is the first signal, the signal using the value detected by the detection means.

The correction means may abandon the value detected by the detection means where it is decided based on the preamble signal acquired by the first acquisition means that the signal is not the first signal.

The correction means may correct, where it is decided that the signal is the first signal, the signal using the value detected by the detection means before a next preamble signal is acquired by the first acquisition means, but abandon, where it is decided that the signal is not the first signal, the value detected by the detection means before a next preamble signal is acquired by the first acquisition means.

The reception apparatus may further include second acquisition means for acquiring, when the signal is the first signal, a different preamble signal succeeding the preamble signal from the signal, and processing inhibition means for inhibiting the detection process by the detection means based on information of the second signal included in the different preamble signal acquired by the second acquisition means.

The information of the second signal may be a length of and a distance between intervals of the second signal of the signal.

The detection means may detect a fine carrier displacement amount based on a guard interval correlation included in the signal, a fine carrier displacement amount based on a pilot signal included in the signal, or a coarse carrier displacement amount or else a sampling error amount as the value for correcting the signal.

According to the first embodiment, also there is provided a reception method including the steps of receiving a signal which includes at least one of a first signal and a second signal which have different structures from each other except that the first and second signals have a preamble signal and acquiring the preamble signal from the received signal, detecting a value for correcting the signal using the signal, and correcting, if it is decided based on the acquired preamble signal that the signal is the first signal, the signal using the detected value.

According to a second embodiment of the present invention, there is provided a reception system including an acquisition section adapted to acquire a signal through a transmission line, and a transmission line decoding processing section adapted to carry out a transmission line decoding process including at least a demodulation process for the signal acquired through the transmission line, the signal acquired through the transmission line including at least one of a first signal and a second signal which have different structures from each other except that the first and second signals have a preamble signal, the transmission line decoding processing section including acquisition means for acquiring the preamble signal from the signal, detection means for detecting a value for correcting the signal using the signal, and correction means for correcting, if it is decided based on the preamble signal acquired by the acquisition means that the signal is the first signal, the signal using the value detected by the detection means.

According to a third embodiment of the present invention, there is provided a reception system including a transmission line decoding processing section adapted to carry out a transmission line decoding process including at least a demodulation process for a signal acquired through a transmission line, and an information source decoding processing section adapted to carry out an information source decoding process including at least a process of decompressing compressed information into original information for the signal for which the transmission line decoding process is carried out, the signal acquired through the transmission line including at least one of a first signal and a second signal which have different structures from each other except that the first and second signals have a preamble signal, the transmission line decoding processing section including acquisition means for acquiring the preamble signal from the signal, detection means for detecting a value for correcting the signal using the signal, and correction means for correcting, if it is decided based on the preamble signal acquired by the acquisition means that the signal is the first signal, the signal using the value detected by the detection means.

According to a fourth embodiment of the present invention, there is provided a reception system including a transmission line decoding processing section adapted to carry out a transmission line decoding process including at least a demodulation process for a signal acquired through a transmission line, and an outputting section adapted to output an image or sound based on the signal for which the transmission line decoding process is carried out, the signal acquired through the transmission line including at least one of a first signal and a second signal which have different structures from each other except that the first and second signals have a preamble signal, the transmission line decoding processing section including acquisition means for acquiring the preamble signal from the signal, detection means for detecting a value for correcting the signal using the signal, and correction means for correcting, if it is decided based on the preamble signal acquired by the acquisition means that the signal is the first signal, the signal using the value detected by the detection means.

According to a fifth embodiment of the present invention, there is provided a reception system including a transmission line decoding processing section adapted to carry out a transmission line decoding process including at least a demodulation process for a signal acquired through a transmission line, and a recording section adapted to record the signal for which the transmission line decoding process is carried out, the signal acquired through the transmission line including at least one of a first signal and a second signal which have different structures from each other except that the first and second signals have a preamble signal, the transmission line decoding processing section including acquisition means for acquiring the preamble signal from the signal, detection means for detecting a value for correcting the signal using the signal, and correction means for correcting, if it is decided based on the preamble signal acquired by the acquisition means that the signal is the first signal, the signal using the value detected by the detection means.

In the reception apparatus and the reception method of the first embodiment and the reception systems of the second to fifth embodiments, a signal which includes at least one of a first signal and a second signal which have different structures from each other except that the first and second signals have a preamble signal is received. Then, the preamble signal is acquired from the received signal, and a value for correcting the signal is detected using the signal. Then, if it is decided based on the acquired preamble signal that the signal is the first signal, then the signal is corrected using the detected value.

With the reception apparatus and method and the reception systems, also where a signal including a signal other than a T2 frame is received, improvement in stability and noise resisting property upon starting of reception can be implemented.

BRIEF DESCRIPTION OF THE DRAWINGS

FIG. 2 is a diagrammatic view illustrating a format of a T2 frame;

FIG. 3 is a diagrammatic view illustrating a format of a FEF;

FIG. 4 is a diagrammatic view illustrating a configuration of a P1 symbol;

FIGS. 5A and 5B are views illustrating an S1 and an S2 included in the P1 symbol;

FIG. 6 is a block diagram showing an example of a configuration of a known reception apparatus;

FIGS. 20, 21 and 22 are block diagrams showing an example of a configuration of reception systems according to first, second and third embodiments of the present invention, respectively; and FIG. 23 is a block diagram showing an example of a configuration of hardware of a computer.

DETAILED DESCRIPTION OF THE PREFERRED EMBODIMENTS

Example of the Configuration of the Reception Apparatus

Figure 1:
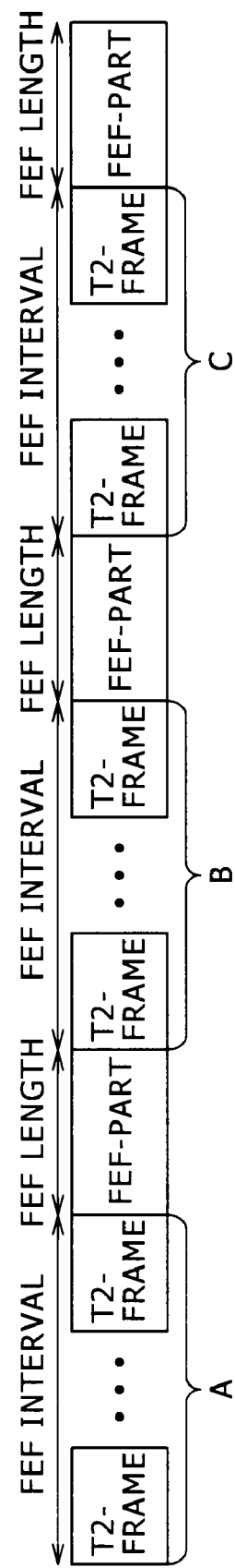
FIG. 1 is a diagrammatic view illustrating a frame configuration of the DVB-T2.
Figure 7:
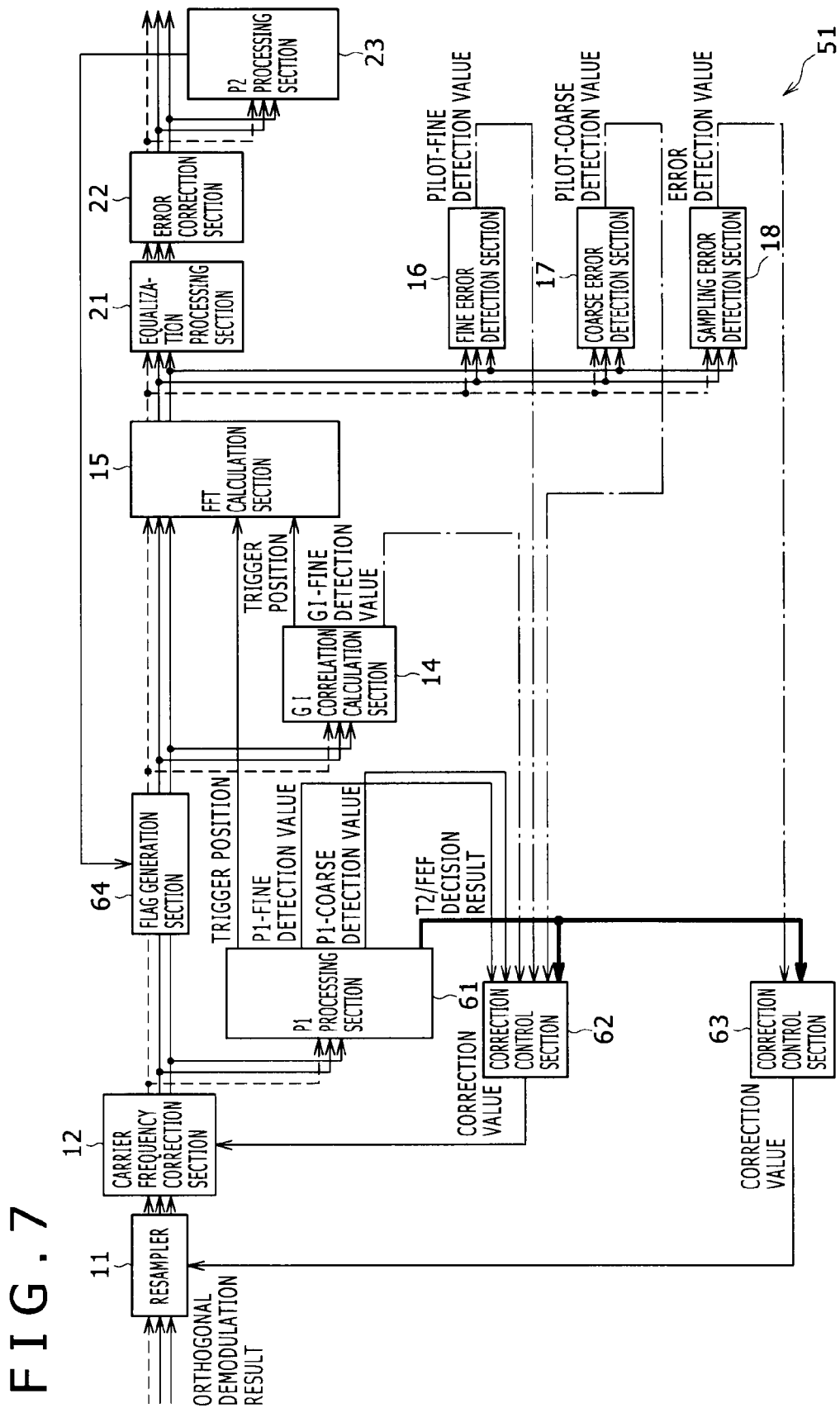
FIG. 7 is a block diagram showing an example of a configuration of a reception apparatus to which the embodiments of the present invention is applied.

FIG. 7 shows an example of a configuration of a reception apparatus 51 to which the embodiments of the present invention is applied. In the configuration shown in FIG. 7, the configuration corresponding to the configuration shown in reception apparatus 1 of FIG. 6 is denoted by the same reference, and the overlapping description will be omitted appropriately.

Referring to FIG. 7, the reception apparatus 51 shown includes a resampler 11, a carrier frequency correction section 12, a GI correlation calculation section 14, a FFT calculation section 15, a fine error detection section 16, a coarse error detection section 17, a sampling error detection section 18, an equalization processing section 21, an error correction section 22, and a P2 processing section 23 similar to those of the reception apparatus 1 described hereinabove with reference to FIG. 6.

The reception apparatus 51 of FIG. 7 is different from the reception apparatus 1 of FIG. 6 in that it includes a P1 processing section 61, a correction control section 62 and another correction control section 63 in place of the P1 processing section 13, correction control section 19 and correction control section 20, respectively, and that it additionally includes a flag generation section 64.

The P1 processing section 61 uses the S1 and the S2 included in the P1 symbol to decide whether the signal being currently received is a T2 frame or a FEF (Future Extension Frame). Then, the P1 processing section 61 outputs a signal representative of a T2/FEF decision result which is a result of the decision to the correction control section 62 and the correction control section 63.

To the correction control section 62, a P1-fine detection value and a P1-coarse detection value from the P1 processing section 13, a GI-fine detection value from the GI correlation calculation section 14, a pilot-fine detection value from the fine error detection section 16 and a pilot-coarse detection value from the coarse error detection section 17 are inputted as values to be used for correction.

The correction control section 62 immediately applies the P1-fine detection value and the P1-coarse detection value from the P1 processing section 13 from among the detection values inputted thereto. On the other hand, the correction control section 62 retains the other detection values once and applies them only where the T2/FEF decision result from the P1 processing section 61 indicates the T2 frame. However, when the T2/FEF decision result does not indicate the T2 frame, the detection values are abandoned.

In particular, the correction control section 62 generates a carrier frequency correction value to be used for correction of an error of the carrier frequency based on the P1-fine detection value and the P1-coarse detection value from the P1 processing section 13 indicated by solid lines from among the detection values inputted thereto. Then, the correction control section 62 outputs the generated carrier frequency correction value to the carrier frequency correction section 12.

In contrast, even if the GI-fine detection value from the GI correlation calculation section 14, the pilot-fine detection value from the fine error detection section 16 and the pilot-coarse detection value from the coarse error detection section 17, which are indicated by intermittent long and short dash lines, are inputted, the correction control section 62 retains them once. Then, if a signal representative of the T2/FEF decision result is inputted from the P1 processing section 61, then the correction control section 62 carries out T2/FEF decision. Then, when the T2/FEF decision result indicates the T2 frame, the correction control section 62 uses also the GI-fine detection value, pilot-fine detection value, pilot-coarse detection value and so forth retained therein to generate a carrier frequency correction value. On the other hand, if the T2/FEF decision result does not indicate the T2 frame, the correction control section 62 does not use the GI-fine detection value, pilot-fine detection value and pilot-coarse detection value retained therein but, for example, abandons them. The operations described are continued until a next P1 symbol is detected.

To the correction control section 63, an error detection value from the sampling error detection section 18 is inputted as a value to be used for correction.

Also the correction control section 63 retains the error detection value indicated by an alternate long and short dash line once. If a signal representative of a T2/FEF decision result is inputted from the P1 processing section 61 as indicated by a thick line, then the correction control section 63 carries out T2/FEF decision. Only when the T2/FEF decision result from the P1 processing section 61 indicates the T2 frame, the correction control section 63 applies the error detection value retained therein to generation of a sampling error correction value. On the other hand, if the T2/FEF decision result does not indicate the T2 frame, then the correction control section 63 does not use the error detection value retained therein for generation of a sampling error correction value but abandons the same. The operations described are continued until a next P1 symbol is detected.

It is to be noted that, in FIG. 7, a broken line representing an input to a block represents a signal of a flag representative of enable or disable for controlling the block to operate or not to operate, and each block receives the flag signal from the preceding stage together with an I component and a Q component of an OFDM time domain signal and outputs the flag signal together with the I and Q components to the succeeding stage. By the signals inputted from the preceding stage not shown, each of the components of the reception apparatus 51 is controlled with regard to which one of the signals inputted should be processed thereby.

The flag generation section 64 is interposed between the carrier frequency correction section 12 and the FFT calculation section 15, and if it does not receive any input signal from the P2 processing section 23, then it outputs the flag signal representative of enable or disable from the preceding stage as it is to the succeeding stage together with the OFDM time domain signal. If values of the FEF interval and the FEF length are inputted from the P2 processing section 23, then the flag generation section 64 decides that the inputted OFDM time domain signal is the Mixed and decides which range of the signal is a FEF. When the signal is within the range of the FEF, the flag generation section 64 generates a flag representative of disable and outputs the generated flag signal to the blocks on the succeeding stage together with the OFDM time domain signal.

Accordingly, where the disable signal is outputted from the flag generation section 64 to the blocks on the succeeding stage, detection values from the blocks on the succeeding stage to the flag generation section 64 are not inputted to the correction control sections 62 and 63. In other words, in this instance, the correction control sections 62 and 63 do not carry out processing using detection values from the blocks succeeding to the flag generation section 64.

The P2 processing section 23 shown in FIG. 7 acquires a signal corresponding to the OFDM symbol of the P2 and carries out decoding of the L1 pre-signaling and the L1 post-signaling. Then, the P2 processing section 23 outputs values of the FEF interval and the FEF length from within the L1 pre-signaling obtained by the decoding to the flag generation section 64.

Example of the Configuration of the P1 Processing Section

Figure 8:
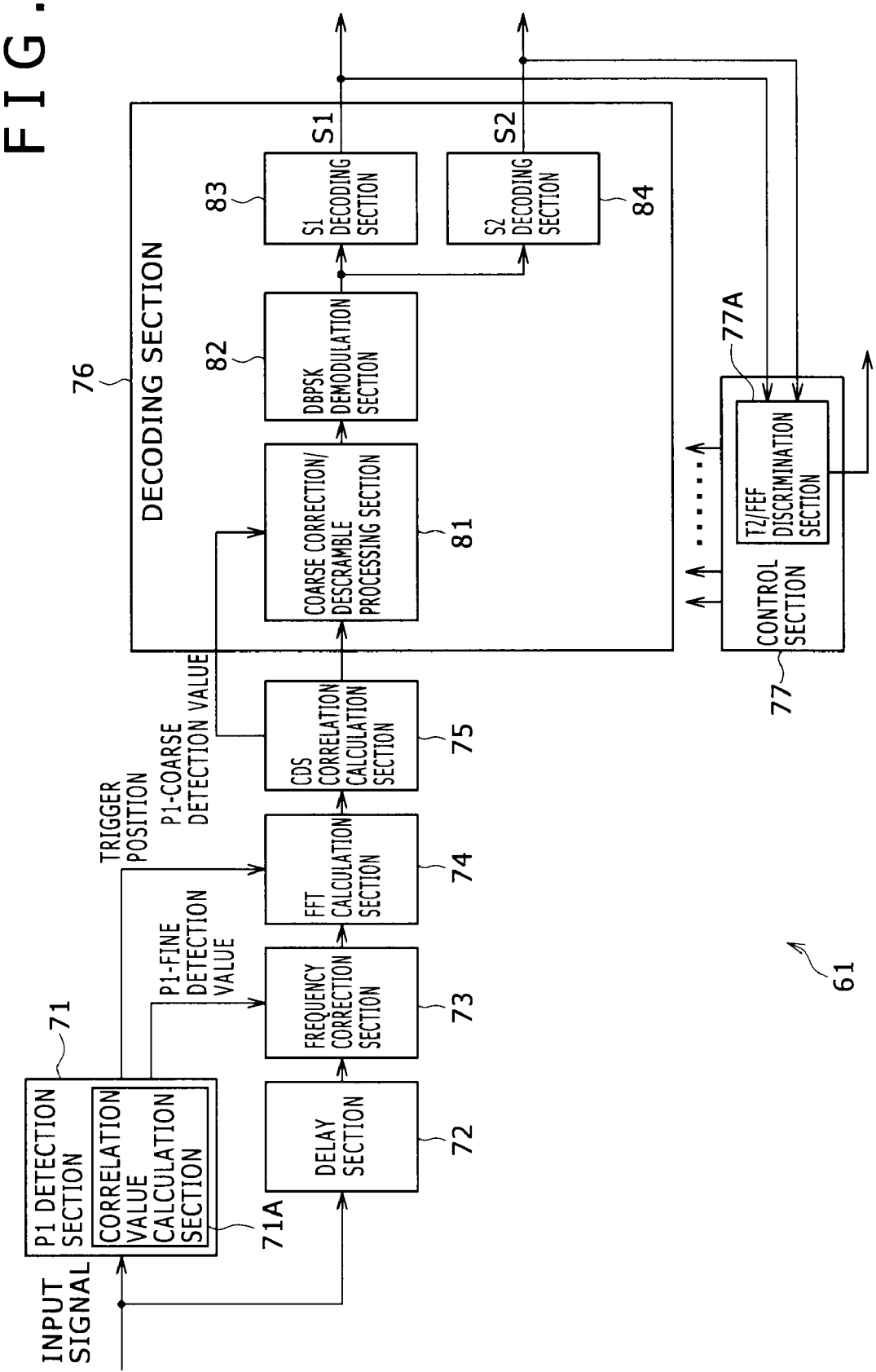
FIG. 8 is a block diagram showing a configuration of a P1 processing section shown in FIG. 7.

FIG. 8 shows an example of a configuration of the P1 processing section.

The P1 processing section 61 includes a P1 detection section 71, a delay section 72, a frequency correction section 73, a FFT calculation section 74, a CDS (Carrier Distribution Sequence) correlation calculation section 75, a decoding section 76, and a control section 77. The P1 detection section 71 include correlation value calculation section 71A, and the decoding section 76 includes a coarse correction/descramble processing section 81, a DBPSK demodulation section 82, an S1 decoding section 83, and an S2 decoding section 84. The control section 77 includes a T2/FEF discrimination section 77A.

An OFDM signal from the carrier frequency correction section 12 is supplied as an input signal to the P1 detection section 71 and the delay section 72. The input signal is a complex signal including a real axis component, that is, an I component, and an imaginary axis component, that is, a Q component. The input signal is an OFDM signal before FFT calculation is carried out.

The correlation value calculation section 71A of the P1 detection section 71 calculates a correlation value for each interval of the input signal to detect a P1 symbol. Details of the calculation of the correlation value carried out by the correlation value calculation section 71A is hereinafter described in detail with reference to FIG. 9.

If a P1 symbol is detected based on a correlation value for each interval, then the P1 detection section 71 sets a start position for FFT calculation with reference to the position of the P1 symbol and outputs a signal representative of the set position, that is, a trigger position, to the FFT calculation section 74. The signal representative of the trigger position is outputted also to the FFT calculation section 15 of FIG. 7.

Further, the P1 detection section 71 detects a frequency error within a carrier interval, that is, a fine carrier frequency offset, and outputs a P1-fine detection value, which is information representative of the frequency error, to the frequency correction section 73. According to the Implementation Guidelines of the DVB-T2 standards (ETSI TR 102 831: IG), the P1 symbol makes it possible to detect a "fine" frequency error of the accuracy of the ±0.5× subcarrier interval. The P1-fine detection value is outputted also to the correction control section 62.

The delay section 72 delays an OFDM signal supplied as an input signal thereto by a period of time required for detection of a P1 symbol by the P1 detection section 71 and so forth and outputs the delayed OFDM signal to the frequency correction section 73.

The frequency correction section 73 corrects the frequency error of the OFDM signal supplied thereto from the delay section 72 based on the P1-fine detection value supplied thereto from the P1 detection section 71 and outputs the OFDM signal after the correction to the FFT calculation section 74.

With the trigger position, which is set by the P1 detection section 71, as the start position, the FFT calculation section 74 carries out FFT calculation of the OFDM signal supplied thereto from the frequency correction section 73, that is, of the symbol of an effective symbol length. By the FFT calculation, an OFDM signal representative of the data transmitted by a subcarrier, that is, a symbol on the IQ constellation, is obtained. The OFDM signal in the frequency domain obtained by the execution of the FFT calculation is supplied to the CDS correlation calculation section 75.

The CDS correlation calculation section 75 calculates a correlation value between a string of subcarriers having electric power of the OFDM signal supplied thereto from the CDS correlation calculation section 75 and a known string (CDS). In the OFDM signal in the frequency domain obtained by execution of the FFT calculation for the signal of the P1 symbol, subcarriers having electric power are distributed only to frequencies determined by the known string. Details of the known string are hereinafter described with reference to FIG. 12.

The CDS correlation calculation section 75 detects the P1 symbol based on the calculated correlation value. For example, the CDS correlation calculation section 75 detects an interval of a string of subcarriers having electric power at which the correlation value with the known string exhibits a maximum value as an interval of the P1 symbol.

In the following description, a correlation value for each interval of the OFDM signal in the time domain calculated by the correlation value calculation section 71A of the P1 detection section 71 is referred to as signal interval correlation value, and a correlation value calculated by the CDS correlation calculation section 75 is referred to as CDS correlation value. Further, a maximum value of the signal interval correlation values is referred to as signal interval correlation peak value, and a maximum value of the CDS correlation value is referred to as CDS correlation peak value.

Further, where the OFDM signal supplied from the FFT calculation section 74 is a signal of the P1 symbol, the CDS correlation calculation section 75 detects a frequency error for each carrier, that is, a coarse carrier frequency offset. According to the Implementation Guidelines (ETSI TR 102 831: IG) of the DVB-T2 standards, it is possible to utilize the correlation of the P1 symbol with the known string to detect a "coarse" frequency error in a unit of a subcarrier interval.

The CDS correlation calculation section 75 outputs the OFDM signal after the FFT calculation and the P1-coarse correction value which is information representative of the detected frequency error to the coarse correction/descramble processing section 81. This P1-coarse detection value is outputted also to the correction control section 62 of FIG. 7.

The coarse correction/descramble processing section 81 corrects the frequency error of the OFDM signal supplied thereto from the CDS correlation calculation section 75 based on the coarse correction value and outputs the OFDM signal obtained by applying processes such as descramble to the DBPSK demodulation section 82.

The DBPSK demodulation section 82 applies DBPSK demodulation to the OFDM signal supplied thereto from the coarse correction/descramble processing section 81. The DBPSK demodulation section 82 outputs a string of the portion of the S1 included in the P1 symbol from within the string of signal points obtained by the DBPSK demodulation to the S1 decoding section 83 and outputs the string of the portion of the S2 to the S2 decoding section 84. It is to be noted that a bit string of 1 and 0 obtained by hard decision of a result of the DBPSK demodulation may be outputted from the DBPSK demodulation section 82 and used for decoding of the S1 and the S2.

The S1 decoding section 83 calculates a correlation value between the string of the signal points supplied thereto from the DBPSK demodulation section 82 and individual ones of eight different known sequences corresponding to the S1 of 3 bits prescribed in the DVB-T2 standards. The S1 decoding section 83 selects a value of 3 bits corresponding to that one of the eight different known sequences from which a maximum correlation value is determined as the S1 and outputs the 3-bit S1 value.

The S2 decoding section 84 calculates a correlation value between the string of the signal points supplied thereto from the DBPSK demodulation section 82 and individual ones of different 16 known sequences corresponding to the S2 of 4 bits prescribed in the DVB-T2 standards. The S2 decoding section 84 selects a value of 4 bits corresponding to that one of the 16 different known sequences from which a maximum correlation value is determined as the S2 and outputs the 4-bit S2 value.

Based on the S1 outputted from the S1 decoding section 83 and the S2 outputted from the S2 decoding section 84, various processes are carried out by circuits at the succeeding stages. The S1 outputted from the S1 decoding section 83 and the S2 outputted from the S2 decoding section 84 are outputted also to the T2/FEF discrimination section 77A of the control section 77.

The control section 77 controls operation of the entire reception apparatus 1 including the configuration shown in FIG. 8. For example, the channel to be received is controlled by the control section 77. The T2/FEF discrimination section 77A of the control section 77 uses the S1 outputted from the S1 decoding section 83 and the S2 outputted from the S2 decoding section 84 to decide whether or not the signal being currently received is a T2 frame or a FEF. Then, the control section 77 outputs a signal representative of a result of the T2/TFT decision to the correction control sections 62 and 63 of FIG. 7.

Example of the Configuration of the Correlation Value Calculation Section

Figure 9:
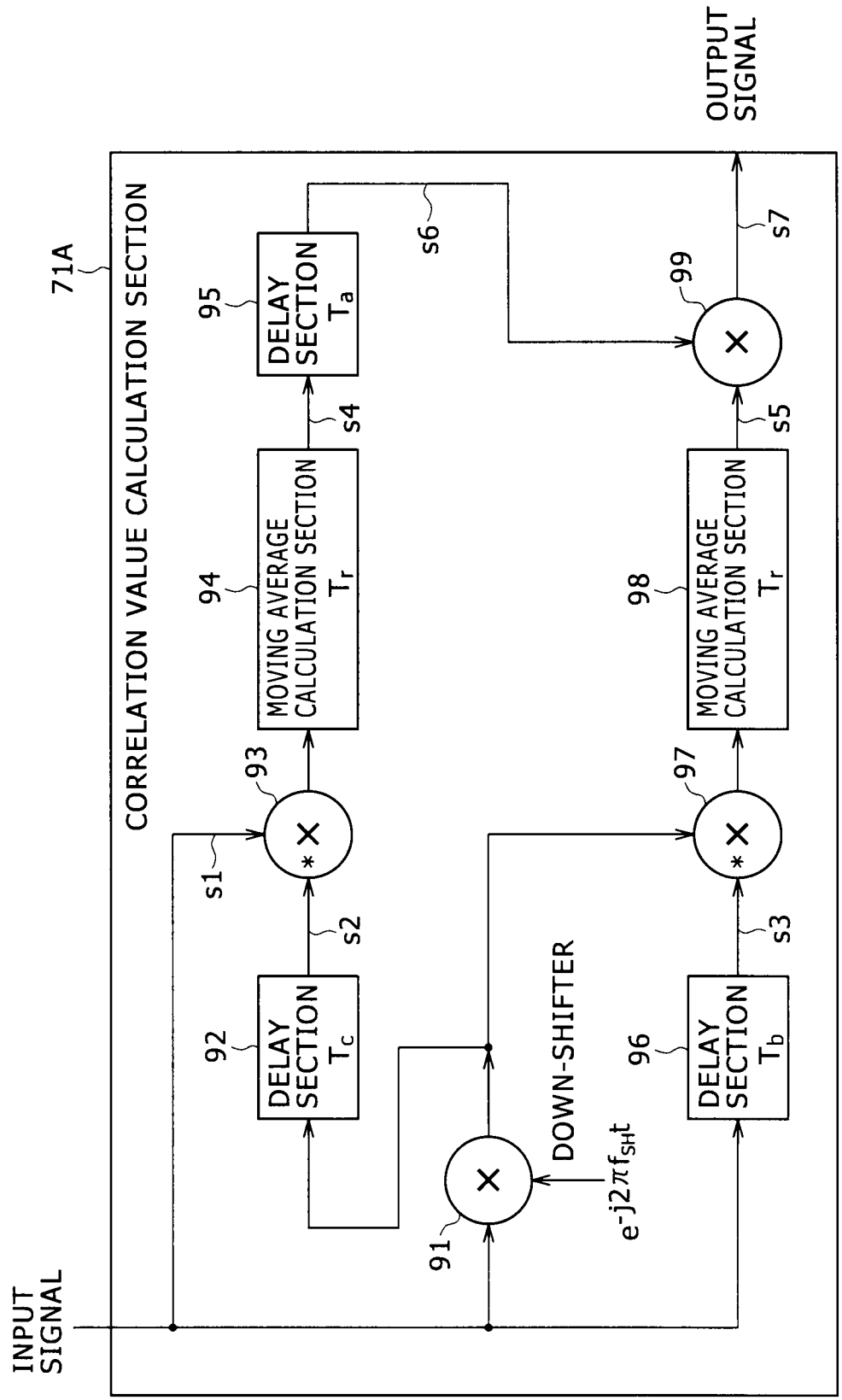
FIG. 9 is a block diagram showing a configuration of a correlation value calculation section shown in FIG. 8.

FIG. 9 shows a configuration of the correlation value calculation section 71A of the P1 detection section 71.

More particularly, FIG. 9 shows a configuration for determining a correlation value of an I component from within the configuration of the correlation value calculation section 71A. Also the configuration for determining a correlation value of a Q component is similar to that shown in FIG. 9.

The correlation value calculation section 71A includes a frequency shifting section 91, a delay section 92, a multiplication section 93, a moving average calculation section 94, another delay section 95, a further delay section 96, another multiplication section 97, another moving average calculation section 98 and a further multiplication section 99. The blocks of the correlation value calculation section 71A carry out processing successively changing over an interval of an object of the processing for each predetermined interval of an OFDM signal inputted thereto.

The frequency shifting section 91 multiplies an input signal by a signal $e^{-j2\pi f_{SH}t}$ to carry out frequency conversion of the input signal so that the frequency of the input signal may be lowered by a frequency $f_{SH}$. Where the interval of an object of processing is an interval of a P1 symbol, the frequencies of the signal C and the signal B in FIG. 4 become equal to the frequency of the signal of the copy source. As described hereinabove with reference to FIG. 4, the signal C copied to the front side of the effective symbol which configure the P1 symbol has a frequency raised by the frequency $f_{SH}$ from that of the signal of the copy source. Meanwhile, the signal B copied to the rear side of the effective symbol has a frequency raised by the frequency $f_{SH}$ from that of the signal of the copy source.

The frequency shifting section 91 outputs the input signal after the frequency conversion to the delay section 92 and the multiplication section 97.

The delay section 92 delays the input signal supplied thereto from the frequency shifting section 91 by a time period Tc equal to the time period or length of the signal C of the P1 symbol and outputs the delayed signal to the multiplication section 93.

The multiplication section 93 multiplies the input signal s1 by the signal s2 supplied thereto from the delay section 92 and outputs a signal representative of a result of the multiplication to the moving average calculation section 94.

The moving average calculation section 94 determines a moving average value of the multiplication result from the multiplication section 93 and outputs a signal representative of the determined moving average value as a signal s4 representative of a correlation value to the delay section 95.

The delay section 95 delays the signal s4 supplied thereto from the moving average calculation section 94 so that a signal s6 to be outputted from the delay section 95 itself may be inputted at the same time with a signal s5 outputted from the moving average calculation section 98 to the multiplication section 99. The delay section 95 outputs the signal s6 after the delay to the multiplication section 99.

The delay section 96 delays an input signal thereto by a time period Tb equal to the period of time of the signal B of the P1 symbol and outputs a delayed signal s3 to the multiplication section 97.

The multiplication section 97 multiplies the signal supplied thereto from the frequency shifting section 91 and the signal s3 supplied thereto from the delay section 96 and outputs a signal representative of a result of the multiplication to the moving average calculation section 98.

The moving average calculation section 98 determines a moving average value of the multiplication results by the multiplication section 97 and outputs a signal representative of the determined moving average value as a signal s5 representative of a correlation value to the multiplication section 99.

The multiplication section 99 multiplies the signal s6 supplied thereto from the delay section 95 and the signal s5 supplied thereto from the moving average calculation section 98 and outputs a signal s7 representative of a result of the multiplication. Based on the signal outputted from the multiplication section 99, the remaining configuration not shown of the P1 detection section 71 determines a signal interval correlation peak value which is a peak value of the correlation value, a trigger position of the FFT and a P1-fine correlation value and supplies them to associated blocks.

Figure 10:
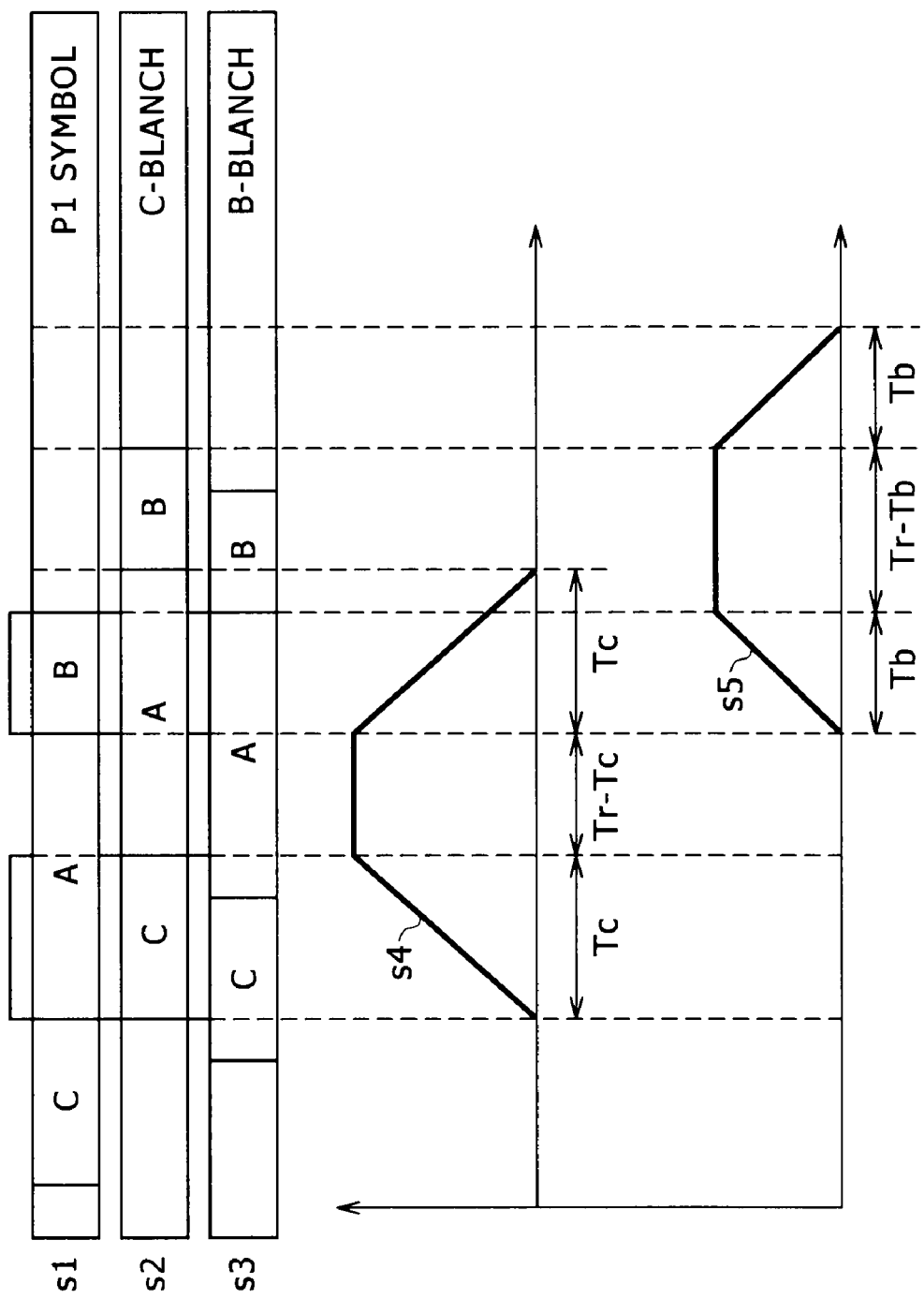
FIGS. 10 and 11 are timing charts illustrating different examples of signals obtained at several components of the correlation value calculation section of FIG. 9.

FIG. 10 illustrates an example of signals obtained by the blocks of FIG. 9.

The signal s1 illustrated on the top stage of FIG. 10 is a signal of the P1 symbol inputted as an input signal to the correlation value calculation section 71A of FIG. 9. When the signal s1 whose top is positioned at the start position of the signal C is inputted, the signal s2 illustrated on the second stage is outputted from the delay section 92. Further, the signal s3 illustrated on the third stage is outputted from the delay section 96. The signal s2 is a signal obtained by delaying the input signal s1 by the time period Tc, and the signal s3 is a signal obtained by delaying the input signal s1 by the time period Tb.

Multiplication of the signal s1 illustrated on the top stage and the signal s2 illustrated on the second stage is calculated by the multiplication section 93, and a moving average value of results of the multiplication is calculated by the moving average calculation section 94. Consequently, a signal s4 having such a waveform as illustrated below the signal s3 is obtained.

As seen in FIG. 10, the signal s4 has such a waveform that it exhibits an increase within an interval of Tc from the start position of the effective symbol A of the input signal, which is the end position of the signal C, and then exhibits a fixed value within the period of Tr−Tc, whereafter it indicates a decrease within a period of Tc. Tr is the length of the effective symbol A as seen on the right side in FIG. 11.

Further, multiplication of the signal s1 illustrated on the highest stage and the signal s3 illustrated on the third stage is carried out by the multiplication section 97, and a moving average value of results of the multiplication is calculated by the moving average calculation section 98. Consequently, a signal s5 having such a waveform as shown below the signal s4 is obtained.

The signal s5 has such a waveform that it exhibits an increase within a period of Tb from the end position of the effective symbol A of the input signal, which is the start position of the signal B, and then exhibits a fixed value within the period of Tr−Tb, whereafter it exhibits a decrease within the period of Tb.

Figure 11:
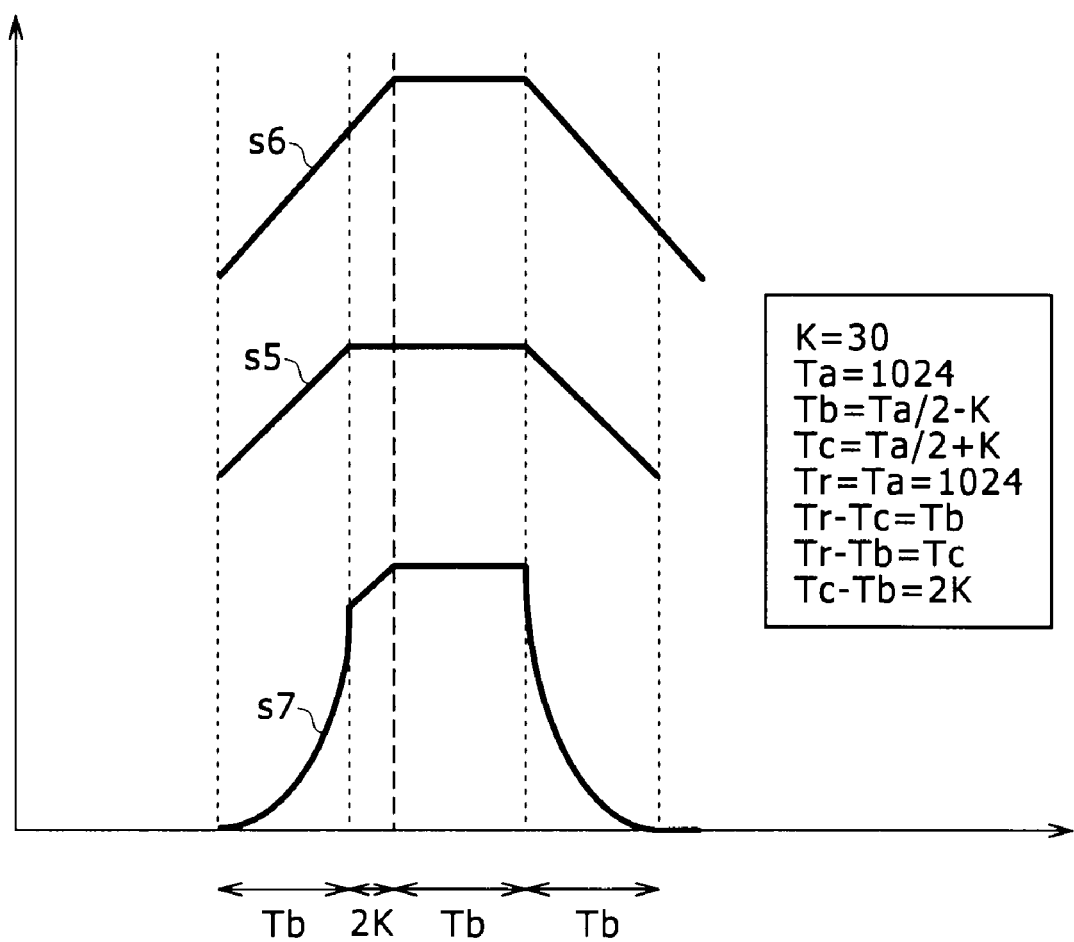

FIG. 11 illustrates a signal representative of a correlation value between the input signal and the delayed input signal delayed by Tc, and another signal representative of a correlation value between the input signal and the delayed input signal delayed by Tb. FIG. 11 further illustrates a signal representative of a correlation value, that is, a signal interval correlation value, determined by multiplication of the two signals.

Where the signal s4 of FIG. 10 is delayed by Ta by the delay section 95, the signal s6 illustrated on the top stage of FIG. 11 is obtained. Multiplication of the signal s6 and the signal s5 is carried out by the multiplication section 99, and consequently, the signal s7 illustrated on the bottom stage is obtained. It is to be noted that, in FIG. 11, the value of K is 30 samples, and the difference between the time period Tc of the signal C and the time period Tb of the signal B is represented by 2K.

In particular, in the P1 detection section 71 of FIG. 8, the position at which a signal interval correlation peak value is detected based on the signal s7 of FIG. 11 determined by the correlation value calculation section 71A is set as the top of the T2 frame.

Figure 12:
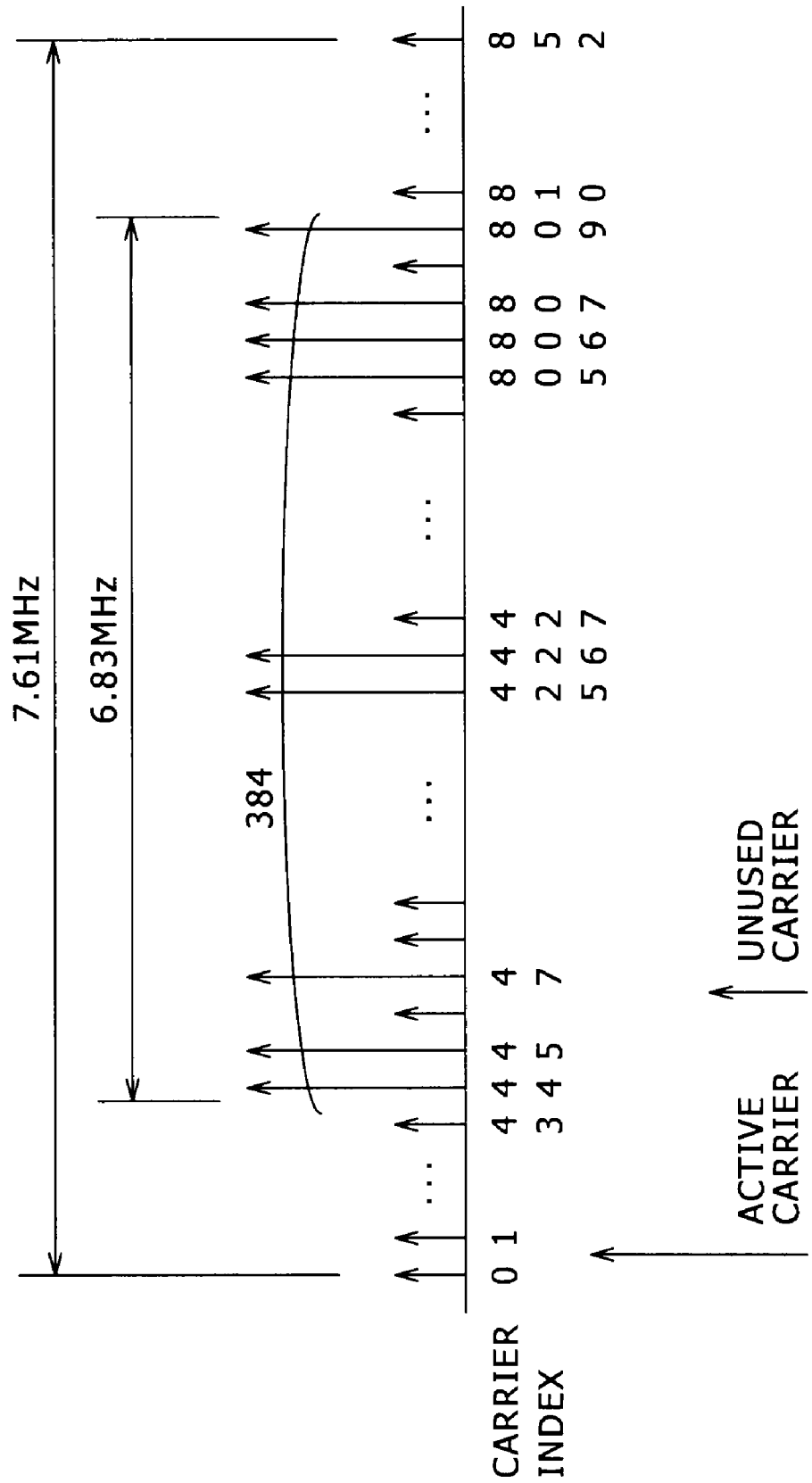
FIG. 12 is a diagrammatic view illustrating the power of an OFDM signal of the P1 symbol.

FIG. 12 illustrates the electric power of the OFDM signal of the P1 symbol.

Referring to FIG. 12, the axis of abscissa represents the carrier index as a frequency and the axis of ordinate represents the electric power of subcarriers. Of upwardly directed arrow marks indicating the subcarriers, a comparatively long arrow mark represents a subcarrier which has electric power with data allocated thereto, that is, an active carrier, and a comparatively short arrow mark represents a subcarrier which does not have electric power without data allocated thereto, that is, an unused carrier.

As seen from FIG. 12, the OFDM signal of the P1 symbol has 853 subcarriers as effective subcarriers, and according to the DVB-T2 standards, data are applied to 384 subcarriers from among the 853 subcarriers.

The CDS correlation calculation section 75 uses such a known string as just described to calculate CDS correlation values and detects an interval of the sub carrier which exhibits a maximum correlation value with the known string and has electric power as an interval of the P1 symbol.

The DBPSK demodulation section 82 carries out DBPSK demodulation for the OFDM signal supplied thereto from the coarse correction/descramble processing section 81 to obtain a string of signal points and then outputs a string of the portion of the S1 included in the P1 symbol from within the string of signal points to the S1 decoding section 83 while it outputs a string of the portion of the S2 to the S2 decoding section 84. It is to be noted that a bit string of 1 and 0 obtained by hard decision of a result of the DBPSK demodulation may be outputted from the DBPSK demodulation section 82 and used for decoding of the S1 and the S2.

Flow of Initial Scanning

Here, processing upon initial scanning carried out by the reception apparatus 51 is described with reference to flow charts of FIGS. 13 and 14.

Figure 13:
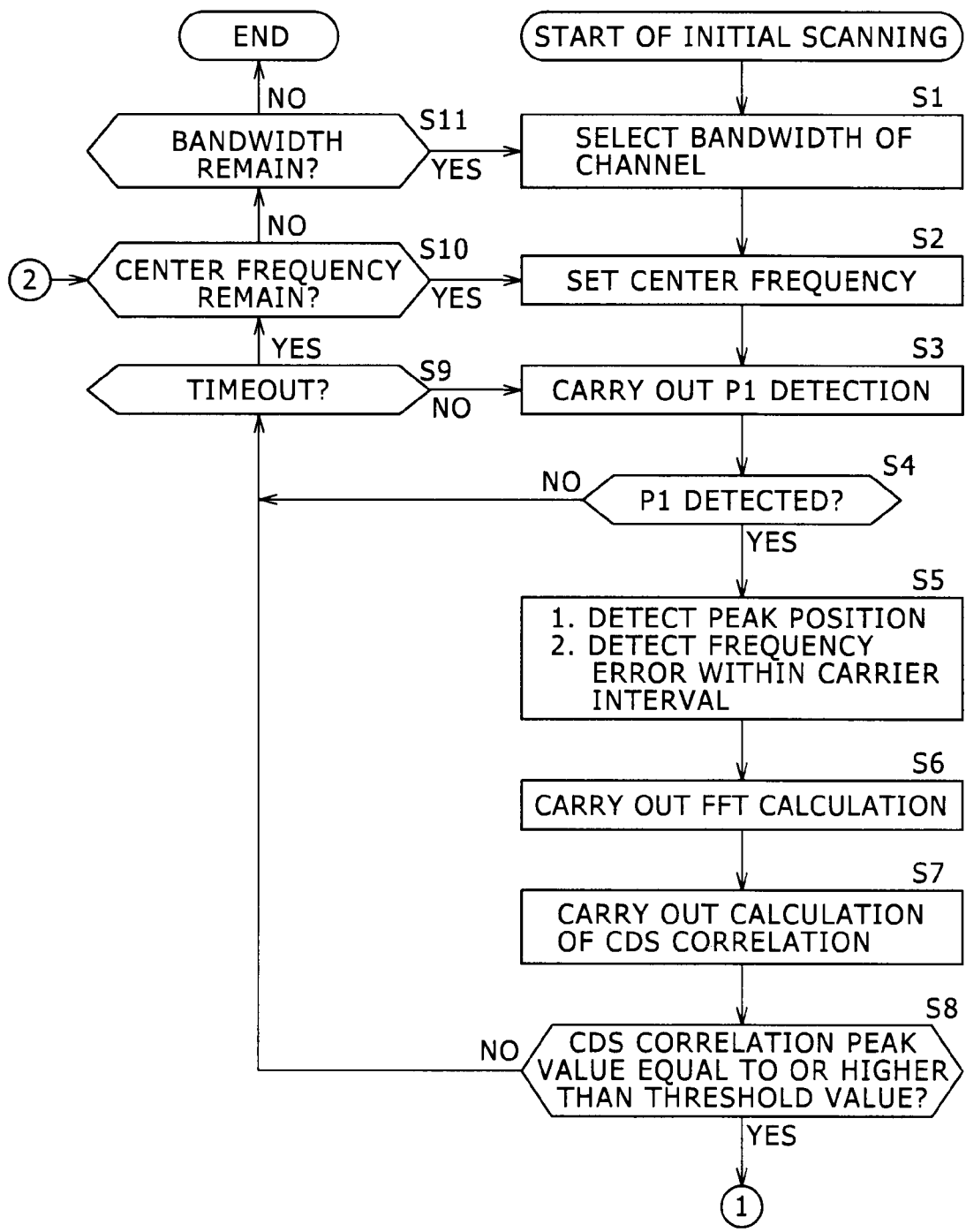
FIGS. 13 and 14 are flow charts illustrating a process upon initial scanning.
Figure 14:
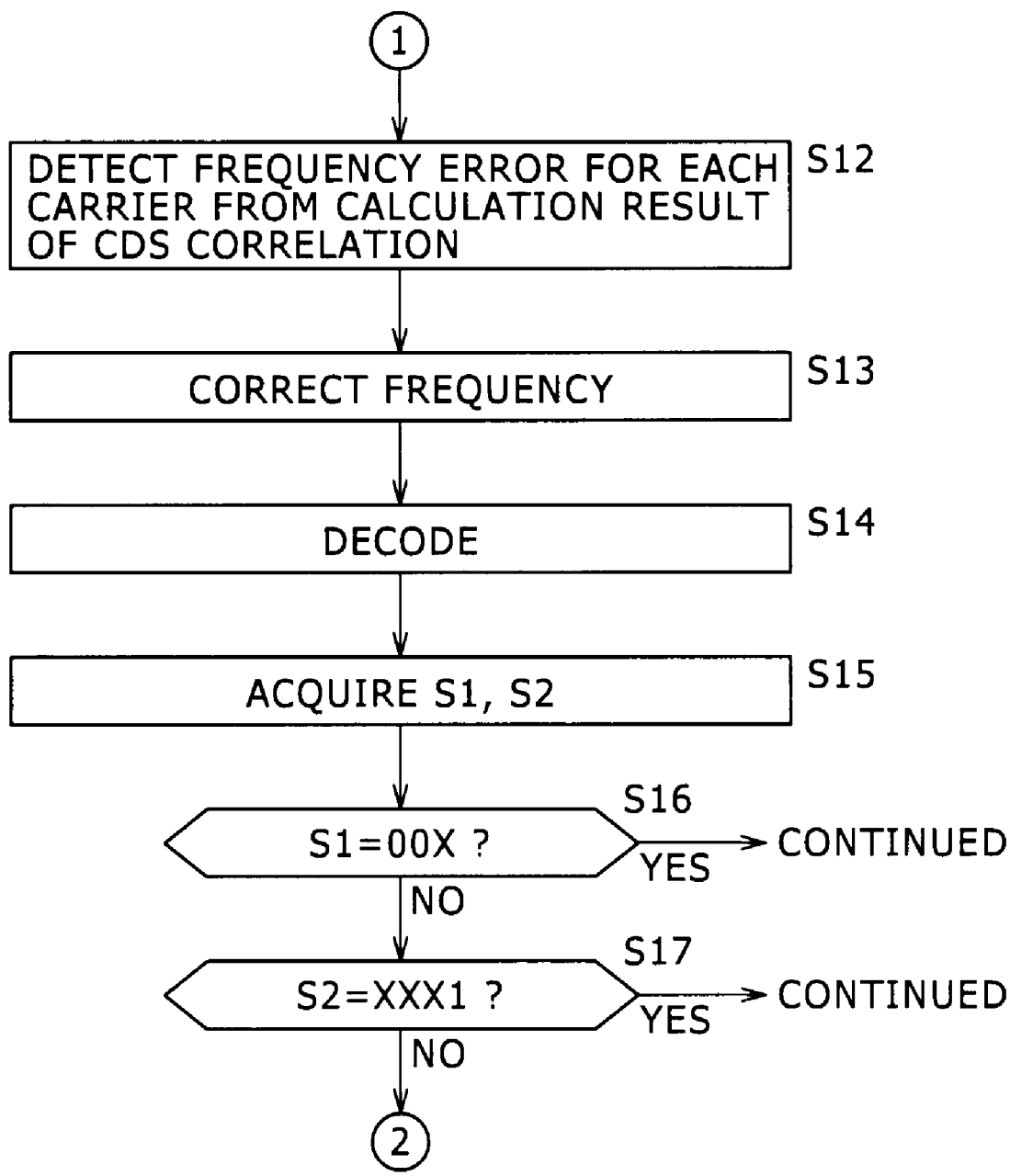

FIGS. 13 and 14 particularly illustrate part of processing upon initial scanning described in index FIG. 74 of the Implementation Guidelines (ETSI TR 102 831: IG) of the DVB-T2 standards. The initial scanning is carried out in order to decide the T2/FEF and so forth, for example, when the power supply is made available first, when the channel is changed and so forth.

First at step S1, the control section 77 controls a tuner not shown to select a channel width of a channel to be received from among a plurality of band widths such as 6 MHz, 7 MHz, 8 MHz and so forth.

At step S2, the control section 77 sets a center frequency of the channel to be received. When a channel width of a channel is selected and a center frequency of the channel of the bandwidth is set, an OFDM signal is inputted to the P1 detection section 71 and the delay section 72.

At step S3, the P1 detection section 71 calculates a signal interval correlation value for each interval of the input signal by means of the correlation value calculation section 71A and carries out detection of a P1 symbol.

At step S4, the P1 detection section 71 decides whether or not a P1 symbol is detected. For example, if a signal interval correlation peak value equal to or higher than a threshold value is detected within a predetermined interval, then the P1 detection section 71 decides that a P1 symbol is detected.

If it is decided at step S4 that a P1 symbol is detected, then the P1 detection section 71 detects a signal interval correlation peak value and sets the detected position to the top of a T2 frame at step S5. The P1 detection section 71 sets a start position of FFT calculation with reference to the position of the P1 symbol, that is, of the top of the T2 frame, and outputs a signal at a trigger position which represents the start position of the FFT calculation to the FFT calculation section 74 and the FFT calculation section 15. Further, the P1 detection section 71 detects a frequency error within a carrier interval and outputs a P1-fine detection value to the frequency correction section 73 and the correction control section 62.

The OFDM signal delayed by the delay section 72 and having the frequency error corrected by the frequency correction section 73 based on the P1-fine detection value is supplied to the FFT calculation section 74.

At step S6, the FFT calculation section 74 carries out FFT calculation for the OFDM signal of the P1 symbol supplied from the frequency correction section 73 based on the trigger position from the P1 detection section 71. The OFDM signal of the frequency domain obtained by the FFT calculate is supplied to the CDS correlation calculation section 75.

At step S7, the CDS correlation calculation section 75 calculates a CDS correlation value based on the OFDM signal after the FFT calculation and the known string.

At step S8, the CDS correlation calculation section 75 decides whether or not the CDS correlation peak value is equal to or higher than the threshold value and a P1 symbol is detected.

If it is decided at step S8 that the CDS correlation peak value is lower than the threshold value or if it is decided at step S4 that a P1 symbol is not detected, then the control section 77 carries out decision of timeout at step S9.

If it is decided at step S9 that a timeout does not occur, then the processing returns to step S3 so that detection of a P1 symbol based on a signal interval correlation value is repeated. The period of time of one T2 frame is 250 ms in the maximum, and when a T2 signal is transmitted by the channel being received, a P1 symbol is detected once per 250 ms. Accordingly, if the period of time after detection of a P1 symbol is started at step S3 exceeds a predetermined period of time equal to the sum of 250 ms and a margin, then it is decided that a timeout occurs. However, if the period of time does not exceed the predetermined period of time, it is decided that a timeout does not occur.

If it is decided at step S9 that a timeout occurs, then the control section 77 decides at step S10 whether or not a center frequency which is not set as yet remains.

If it is decided at step S10 that a center frequency which is not set as yet remains, then the processing returns to step S2, at which the control section 77 sets a new frequency as a center frequency. Thereafter, the processes described above are repeated.

On the other hand, if it is decided at step S10 that a center frequency which is not set as yet does not remain, then the control section 77 decides at step S11 that a bandwidth which is not selected as yet remains.

If it is decided at step S11 that a bandwidth which is not selected as yet remains, then the processing returns to step S1, at which the control section 77 selects a new bandwidth. Thereafter, the control section 77 repeats the processes described hereinabove.

On the other hand, if it is decided at step S11 that a bandwidth which is not selected as yet does not remain, then the control section 77 ends the initial scanning.

If it is decided at step S8 that the CDS correlation value peak value is equal to or higher than the threshold value and a P1 symbol is detected, then the CDS correlation calculation section 75 detects a frequency error of each charier based on the CDS correlation values at step S12. Further, the CDS correlation calculation section 75 outputs the OFDM signal after the FFT calculation and the P1-coarse correction value to the coarse correction/descramble processing section 81. This P1-coarse correction value is outputted also to the correction control section 62.

At step S13, the coarse correction/descramble processing section 81 corrects the frequency error of the OFDM signal based on the P1-coarse correction value and carries out such processes as descramble for the OFDM signal.

At step S14, the decoding section 76 carries out decoding of the S1 and the S2. In particular, the DBPSK demodulation section 82 carries out DBPSK demodulation for the OFDM signal for which frequency error correction and so forth are applied by the coarse correction/descramble processing section 81. The S1 decoding section 83 and the S2 decoding section 84 calculates correlation values between the string of signal points supplied thereto from the DBPSK demodulation section 82 and the known sequence.

At step S15, the S1 decoding section 83 selects the S1 based on the calculated correlation values and the S2 decoding section 84 selects the S2 based on the calculated correlation values. The S1 selected by the S1 decoding section 83 and the S2 selected by the S2 decoding section 84 are supplied also to the T2/FEF discrimination section 77A of the control section 77.

At step S16, the T2/FEF discrimination section 77A of the control section 77 decides whether or not the S1 selected by the S1 decoding section 83 is "00X" (where X is 0 or 1).

As described hereinabove with reference to FIG. 5A, that the 3 bits of the S1 in the DVB-T2 standards are "00X" represents that a frame including the S1 is a T2 frame. That the 3 bits of the S1 are any other than "00X" represents that the frame which includes the S1 is not a T2 frame but is a FEF.

If it is decided at step S16 that the S1 selected by the S1 decoding section 83 is not "00X," then the T2/FEF discrimination section 77A of the control section 77 decides at step S17 whether or not the S2 selected by the S2 decoding section 84 is "XXX1."

As described hereinabove with reference to FIG. 5B, that the 4 bits of the S2 in the DVB-T2 standards are "XXX1" represents that the channel being currently received includes T2 frames and FEFs in a mixed state (Mixed). In particular, it is decided that the signal being currently received is a FEF from a signal including T2 frames and FEFs mixed therein.

If it is decided at step S16 that the S1 selected by the S1 decoding section 83 is "00X" or if it is decided at step S17 that the S2 selected by the S2 decoding section 84 is "XXX1," then the processing is continued.

For example, if it is decided at step S16 that the S1 selected by the S1 decoding section 83 is "00X," then it is decided whether or not the S2 is "XXX1" (not shown). If it is decided by the decision that the S2 is not "XXX1," then it is decided that the channel being currently received is a channel which transmits only a T2 signal. On the other hand, if it is decided that the S2 is "XXX1," then it is decided that the channel being currently received is a channel in which T2 signals and FEFs are included in a mixed state. In particular, it is decided that the signal being currently received is a portion of a T2 frame from within a signal which includes T2 frames and FEFs in a mixed state therein.

Thereafter, in both cases, setup processes for acquisition of the L1 pre-signaling and the L1 post-signaling of the P2 symbol such as detection of information of the SISO/MISO and information of the FFT size and detection and acquisition of a guard interval are carried out, and a P2 symbol is acquired. After acquisition of a P2 symbol, the processing returns to step S10 of FIG. 13 so that the processes at the steps beginning with step S10 are repeated.

For example, if it is decided at step S17 that the S2 selected by the S2 decoding section 84 is "XXX1" and then a next P1 symbol is detected, then the processes at steps S5 to S15 are carried out, and then it is decided again whether or not the S1 is "00X." If the S1 is "00X," then it is decided that the channel being currently received is a channel in which T2 signals and FEFs are included in a mixed manner, and the setup processes described above for P2 symbol acquisition are carried out. On the other hand, if the S1 is not "00X," then the processing returns to step S10 of FIG. 13 such that the processes described hereinabove are repeated.

On the other hand, if it is decided at step S17 that the S2 is not "XXX1," then the processing returns to step S10 of FIG. 13 and the processes described above are repeated.

Figure 15:
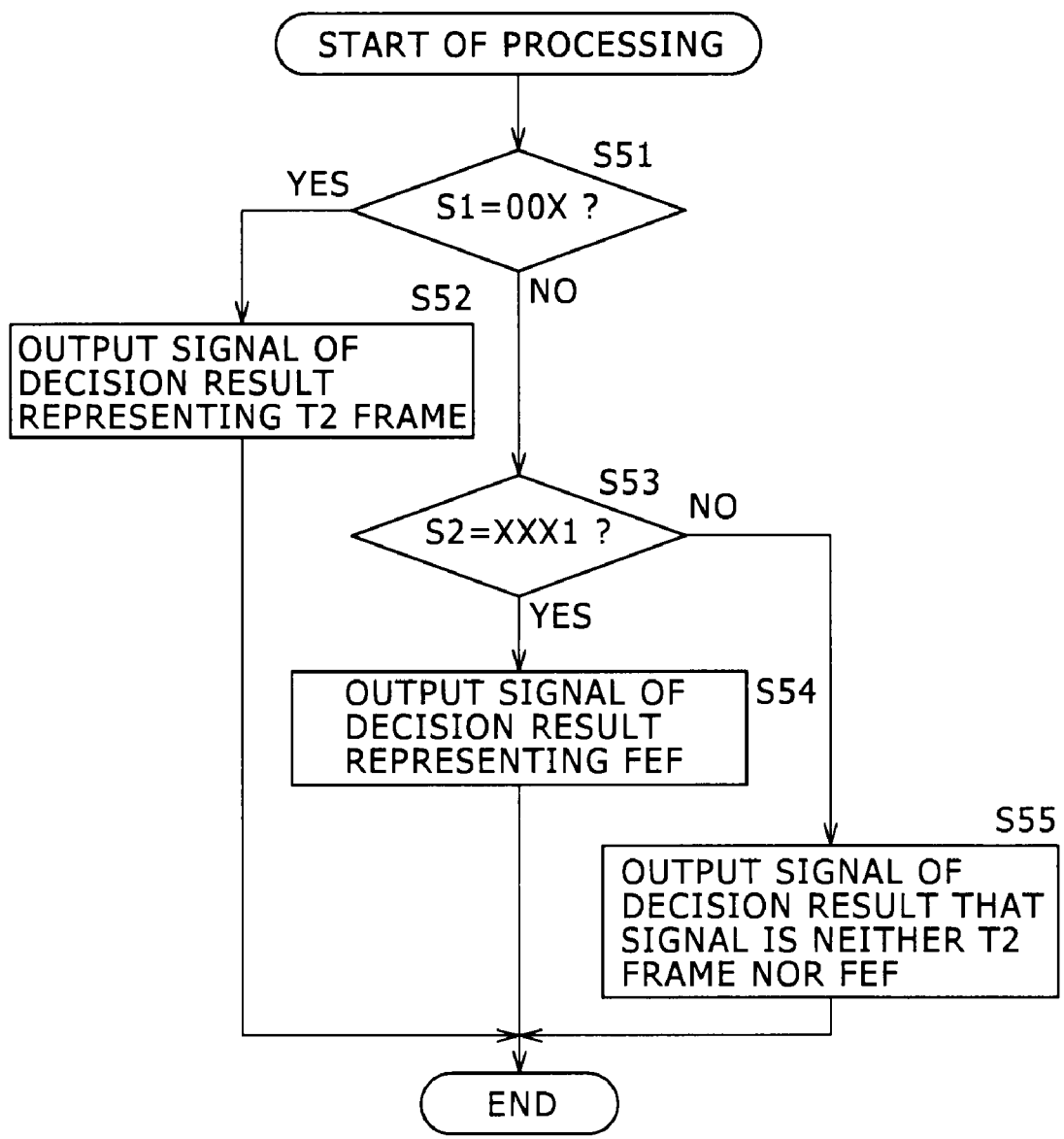
FIG. 15 is a flow chart illustrating a process of a T2/FEF discrimination section upon initial scanning.

FIG. 15 illustrates processing of the T2/FEF discrimination section 77A from within the processing upon initial scanning described hereinabove with reference to FIGS. 13 and 14.

At step S51, the T2/FEF discrimination section 77A decides whether or not the S1 selected by the S1 decoding section 83 is "00X." If it is decided at step S51 that the S1 selected by the S1 decoding section 83 is "00X," then the T2/FEF discrimination section 77A generates a decision result representing that the signal is a T2 frame and outputs a signal of the decision result to the correction control sections 62 and 63.

If it is decided at step S51 that the S1 selected by the S1 decoding section 83 is not "00X," then the T2/FEF discrimination section 77A decides at step S53 whether or not the S2 selected by the S2 decoding section 84 is "XXX1."

If it is decided at step S53 that the S2 selected by the S2 decoding section 84 is "XXX1," then the T2/FEF discrimination section 77A generates a decision result representing that the signal is a FEF and outputs a signal of the decision result to the correction control sections 62 and 63.

On the other hand, if it is decided at step S53 that the S2 selected by the S2 decoding section 84 is not "XXX1," then the T2/FEF discrimination section 77A generates a decision result representing that the signal is neither a T2 frame nor a FEF and outputs a signal of the decision result to the correction control sections 62 and 63.

It is to be noted that, in the description above of the example of FIG. 15, after it is decided at step S53 whether or not the S2 is "XXX1," a decision result representing whether or not the signal is a FEF or is neither a T2 frame nor a FEF is outputted in response to a result of the decision. However, since only it is necessary for the correction control sections 62 and 63 to discriminate at least whether or not the signal is a T2 frame, when it is decided at step S51 that the S1 is not "00X," a decision result representing that the signal is not a T2 frame may be outputted.

The correction control sections 62 and 63 receive the signals representative of the results of decision and individually carry out processing in the following manner.

Figure 16:
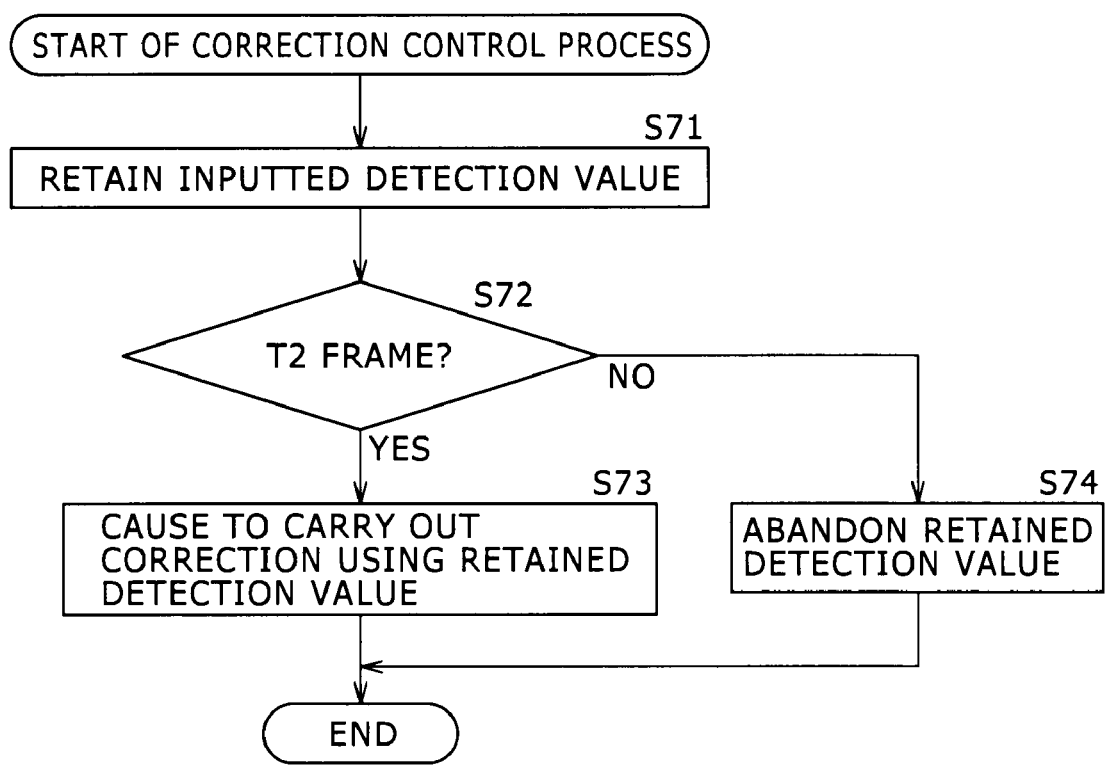
FIG. 16 is a flow chart illustrating a correction control process of a correction control section.

FIG. 16 illustrates the correction control process of the correction control section 62. It is to be noted that, although contents of the correction and the inputted detection values are different, also the correction control section 63 carries out basically similar processing.

This process is started when it is decided that a P1 symbol is detected when the correction control section 62 receives a P1-fine detection value from the P1 processing section 61. Further, the correction control section 62 receives a P1-fine detection value and a P1-coarse detection value from the P1 processing section 61 and uses them to generate a carrier frequency correction value concurrently. It is to be noted that, though not shown in FIG. 7, some signal representing that a P1 symbol is detected and replacing the P1-fine detection value and the P1-coarse detection value from the P1 processing section 61 is inputted also to the correction control section 63.

Unless it is decided by the flag generation section 64 that the signal is a FEF, the GI-fine detection value from the GI correlation calculation section 14, the pilot-fine detection value from the fine error detection section 16 and the pilot-coarse detection value from the coarse error detection section 17 are inputted. In other words, if a P2 symbol is acquired and the values of the FEF interval and the FEF length are inputted to the flag generation section 64 and then it is decided based on the P2 symbol and the values that the signal being currently received is a FEF, then since the detection values mentioned are not inputted, the correction control process of FIG. 16 is not carried out.

At step S71, the correction control section 62 retains the detection values inputted thereto, that is, the GI-fine detection value from the GI correlation calculation section 14, the pilot-fine detection value from the fine error detection section 16 and the pilot-coarse detection value from the coarse error detection section 17. Then, the correction control section 62 retains the inputted detection values except the P1-fine detection value and the P1-coarse detection value until it is decided at step S72 whether or not the signal is a T2 frame.

Meanwhile, the P1 processing section 61 carries out the processes described hereinabove with reference to FIGS. 13 to 15 and a signal of a T2/FEF decision result is inputted from the T2/FEF discrimination section 77A. The correction control section 62 decides at step S72 whether or not the T2/FEF decision result represents that the signal is a T2 frame, that is, whether or not the signal being currently received is a T2 frame.

If it is decided at step S72 that the signal being currently received is a T2 frame, then the processing advances to step S73, at which the correction control section 62 controls the carrier frequency correction section 12 to carry out correction using the retained detection values.

In particular, the correction control section 62 uses the GI-fine detection value, pilot-fine detection value and pilot-coarse detection value retained therein to generate a carrier frequency correction value for further correcting an error by correction with the P1-fine detection value and the P1-coarse detection value and supplies the carrier frequency correction value to the carrier frequency correction section 12.

Thereafter, the correction control section 62 can apply detection values successively inputted thereto to immediate correction until a next P1 symbol is received and the process described above, that is, the process of FIG. 16, is started for the next P1 symbol.

On the other hand, if it is decided at step S72 that the signal being currently received is a T2 frame, then the processing advances to step S74. At step S74, the correction control section 62 abandons the GI-fine detection value, pilot-fine detection value and pilot-coarse detection value retained therein, thereby ending the processing. In other words, the correction control section 62 stands by until a next P1 symbol is received and the processing is started for the next P1 symbol.

Figure 17:
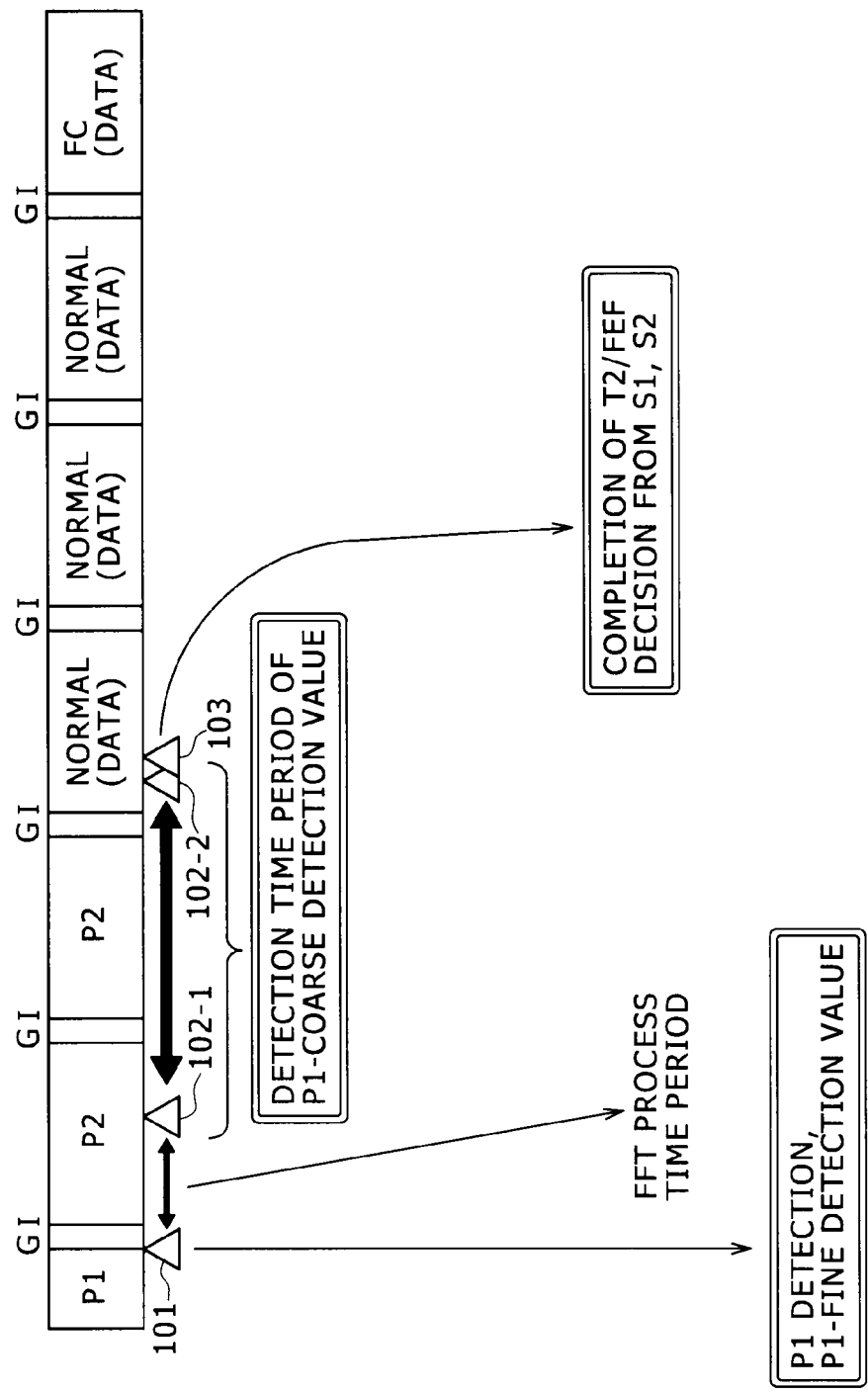
FIG. 17 is a diagrammatic view illustrating a period of time before a decision result of T2/FEF is obtained.
Figure 18:
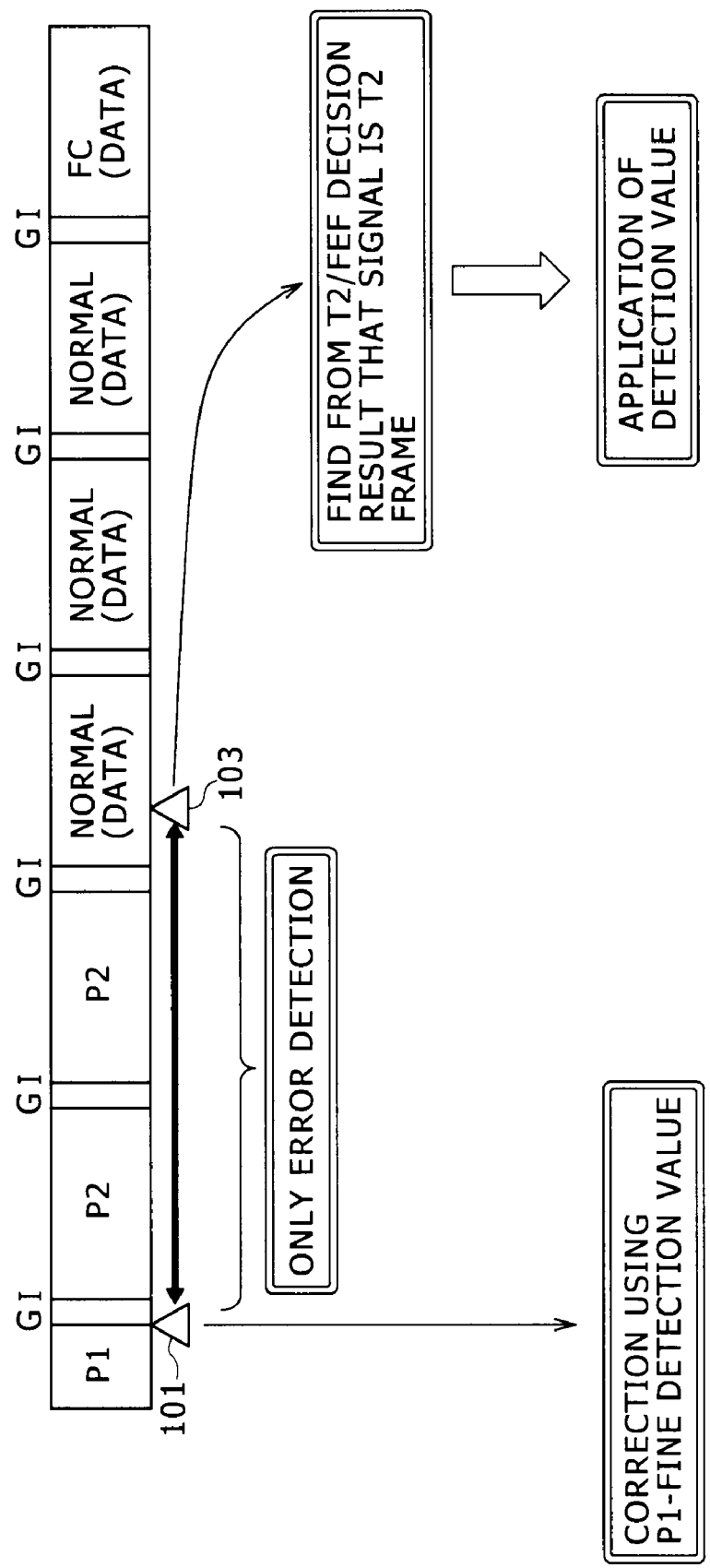
FIG. 18 is a diagrammatic view illustrating a timing at which a detection value is applied.

FIG. 17 illustrates the period of time before a decision result of T2/FEF is obtained, and FIG. 18 illustrates a timing for correction. It is to be noted that, in FIGS. 17 and 18, the axis of abscissa indicates the time, and a triangle mark indicates a predetermined timing.

The triangle 101 indicates the timing at which the P1 detection section 71 detects a P1 symbol and a P1-fine detection value is determined simultaneously with the P1 detection and which indicates the timing at which FFT calculation is to be started. The triangle 102-1 indicates the timing of completion of the FFT calculation by the 74 and indicates the timing at which CDS correlation calculation for determining a P1-coarse detection value is to be determined by the CDS correlation calculation section 75. In other words, the interval between the triangle 101 and the triangle 102-1 represents a FFT processing time period although it depends upon the mounting.

The triangle 102-2 indicates the timing at which a P1-coarse detection value is determined by the CDS correlation calculation section 75. In other words, the interval between the triangle 102-1 and the triangle 102-2 represents a detection time period of the P1-coarse detection value. It is to be noted that also this time period depends upon the mounting resource and the detection range.

The triangle 103 indicates a timing at which the decision of T2/FEF from the S1 and the S2 is completed by the T2/FEF discrimination section 77A. In other words, the interval between the triangle 101 and the triangle 103 represents a time period within which T2/FEF decision is proceeding, that is, a T2/FEF unsettled interval.

Although the FFT processing time period represented by the interval between the triangle 101 and the triangle 102-1 and the detection period of the P1-coarse detection value represented by the interval between the triangle 102-1 and the triangle 102-2 depend upon the mounting in this manner, where they are long, the decision completion timing of T2/FEF indicated by the triangle 103 becomes later than the interval of the P2 symbol.

Thus, at the timing represented by the triangle 101 at which the P1-fine detection value is determined, correction with the P1-fine detection value is carried out as seen in FIG. 18. On the other hand, within a time period represented by the interval between the triangle 101 and the triangle 103 within which T2/FEF decision is proceeding, only error detection by the blocks other than the P1 processing section 61, that is, by the GI correlation calculation section 14, fine error detection section 16, coarse error detection section 17 and sampling error detection section 18, is carried out. Then, at the timing of the triangle 103 at which the decision of T2/FEF is completed, it can be known from the result of the T2/FEF decision result that the signal is a T2 frame. Therefore, the correction control sections 62 and 63 apply the detection values, whose error is detected within the period between the triangle 101 and the triangle 103, after the timing indicated by the triangle 103.

Figure 19:
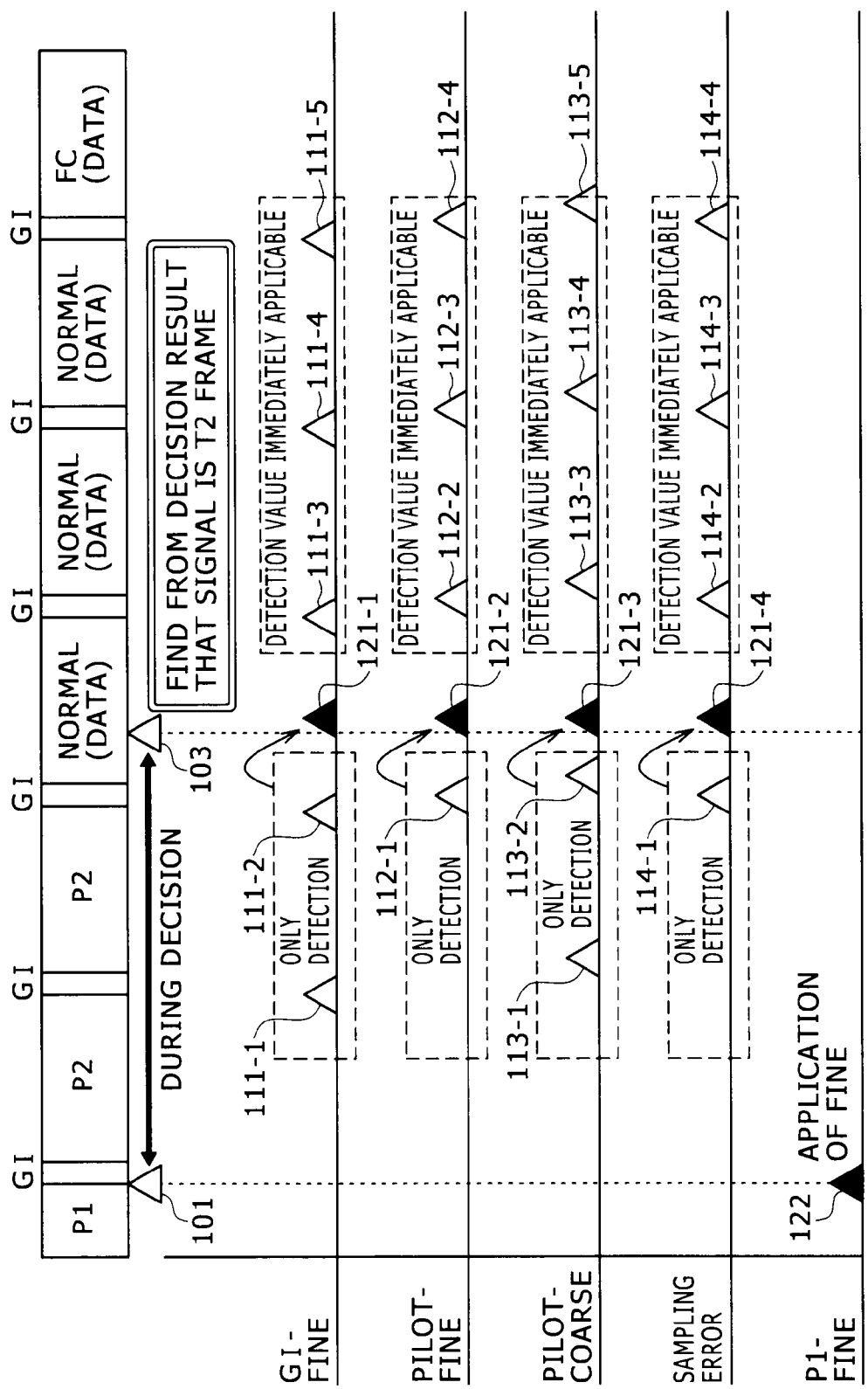
FIG. 19 is a timing chart illustrating timings of detection of an error and application of a detection value.

FIG. 19 illustrates detection of an error and a timing at which a detection value is applied. It is to be noted that, in FIG. 19, those triangles which correspond to those of FIGS. 17 and 18 are denoted by corresponding reference characters.

In the example of FIG. 19, the triangles 111 to 114 indicate error detection timings of the GI-fine detection value, pilot-fine detection value, pilot-coarse detection value and sampling error detection value, and the triangle 121 indicates a timing at which the detection values are applied. Further, the triangle 122 indicates a timing at which the P1-fine detection value is applied.

In particular, the P1-fine detection value from the P1 processing section 61 is detected at the timing indicated by the triangle 101 and is applied to carrier frequency correction at an immediately later timing indicated by the triangle 122.

On the other hand, as regards the GI-fine detection value from the GI correlation calculation section 14, detection is carried out twice as indicated by the triangles 111-1 and 111-2 within a period of time represented by the triangle 101 and the triangle 103 within which the T2/FEF decision is proceeding. Thus, two GI-fine detection values are retained into the correction control section 62. Then, at the timing of the triangle 103 at which the decision of T2/FEF is completed, it is decided from a result of the T2/FEF decision that the signal is a T2 frame. Therefore, the GI-fine detection values are applied to carrier frequency correction by the correction control section 62 at a timing indicated by the triangle 121-1 later than the timing of the triangle 103. It is to be noted that, also after then, the GI correlation calculation section 14 successively detects the GI-fine detection value as indicated by the triangles 111-3, 111-4 and 111-5, and the detected GI-fine detection values can be applied immediately before a next P1 symbol is detected.

As regards the pilot-fine detection value from the fine error detection section 16, detection is carried out once as indicated by the triangle 112-1 within a period of time represented by the triangle 101 and the triangle 103 within which the T2/FEF decision is proceeding. Thus, the single pilot-fine detection value obtained by the detection is retained into the correction control section 62. Then, at the timing of the triangle 103 at which the decision of T2/FEF is completed, it is known from a result of the T2/FEF decision that the signal is a T2 frame. Therefore, the pilot-fine detection value is applied to carrier frequency correction by the correction control section 62 at a timing indicated by the triangle 121-2 later than the timing of the triangle 103. It is to be noted that, also after then, the fine error detection section 16 successively detects pilot-fine detection values as indicated by the triangles 112-2, 112-3 and 112-4, and the detection values can be applied immediately before a next P1 symbol is detected.

As regards the pilot-coarse detection value from the coarse error detection section 17, detection is carried out twice as indicated by the triangles 113-1 and 113-2 within a period represented by the triangle 101 and the triangle 103 within which the T2/FEF decision is proceeding. Thus, two detection values obtained by the detection are retained into the correction control section 62. Then, at the timing of the triangle 103 at which the decision of T2/FEF is completed, it is known from a result of the T2/FEF decision that the signal is a T2 frame. Therefore, the pilot-coarse detection values are applied to carrier frequency correction by the correction control section 62 at a timing indicated by the triangle 121-3 later than the timing of the triangle 103. It is to be noted that, also after then, the coarse error detection section 17 successively detects pilot-coarse detection values as indicated by the triangles 113-3, 113-4 and 113-5, and the error correction values can be applied immediately before a next P1 symbol is detected.

As regards the error detection value from the sampling error detection section 18, detection is carried out once as indicated by the triangle 114-1 within the period of time between the triangle 101 and the triangle 103 within which the T2/FEF decision is proceeding. Thus, a single error correction value is retained into the correction control section 63. Then at the timing of the triangle 103 at which the decision of T2/FEF is completed, it is known from a result of the T2/FEF decision that the signal is a T2 frame. Therefore, the error detection value is applied to sampling error correction by the correction control section 63 at a timing indicated by the triangle 121-4 later than the timing of the triangle 103. It is to be noted that, also after then, the sampling error detection section 18 successively detects error detection values as indicated by the triangles 114-2, 114-3 and 114-4, and the error correction values can be applied immediately before a next P1 symbol is detected.

It is to be noted that, in the example of FIG. 19, detection of the GI-fine detection value and the pilot-coarse detection value is carried out twice within the time period represented by the triangle 101 and the triangle 103 within which the T2/FEF decision is proceeding. In particular, where a detection value can be detected once for one OFDM symbol and a delay by more than two OFDM symbols is provided before values of the S1 and the S2 are obtained, a detection value can be acquired by a plural number of times like the GI-fine detection value and the pilot-coarse detection value of FIG. 19.

Here, the carrier frequency correction with the GI-fine detection value, pilot-fine detection value, pilot-coarse detection value and so forth and the sampling frequency correction with the error detection value have a characteristic that the influence of noise can be reduced by averaging of detection values by accumulation.

Accordingly, by carrying out an averaging process by accumulation of detection values, reasonable improvement in accuracy of the error detection value can be anticipated. Accordingly, it is possible to avoid the loss of a detection opportunity for error detection within a T2/FEF unsettled interval.

As described above, in the present embodiment, only detection of an error is carried out within a T2/FEF unsettled interval, and when it is decided that the signal is a T2 frame, the detected value is used for correction of the error.

Previously, where a signal of the "Mixed" is received, for a period of time before the values of the S1 and the S2 included in the P1 pilot are acquired, there is the possibility that the signal being currently received may be a FEF. Therefore, correction of a carrier frequency error and correction of a sampling frequency error are restricted.

Particularly since the P2 symbol includes a greater number of pilots than an ordinary symbol and such pilots are interposed at fixed intervals without depending upon the pilot pattern, correction of a higher degree of accuracy is originally possible in error detection which utilizes the pilots. However, since it cannot be decided at the top of a frame whether the signal is a T2 or a FEF, that this cannot be utilized has a significance on a noise resisting property immediately after starting of reception and on stabilized pull in.

Thus, according to the present invention, since, also within a T2/FEF unsettled interval, detection of an error can be carried out similarly as in the case wherein a T2 frame is being received and an error correction value can be applied when it is decided that the signal is a T2 frame. Therefore, such restriction as described hereinabove which occurs during reception of a signal of the "Mixed" can be prevented or moderated.

From the foregoing, also where a signal including a signal other than a T2 frame is received, improvement in stability and noise resisting property upon starting of reception can be implemented.

It is to be noted that, while, in the description given above, an example wherein a signal which includes at least one of a T2 frame and the FEF part is received is described, the present invention is not limited to the T2 frame or the FEF part, and the number of signals involved is not limited to two. In other words, the present invention can be applied to an apparatus which receives a signal which includes at least one of a plurality of signals having different structures from each other and extracts the signals.

MODIFICATIONS

Figure 20:
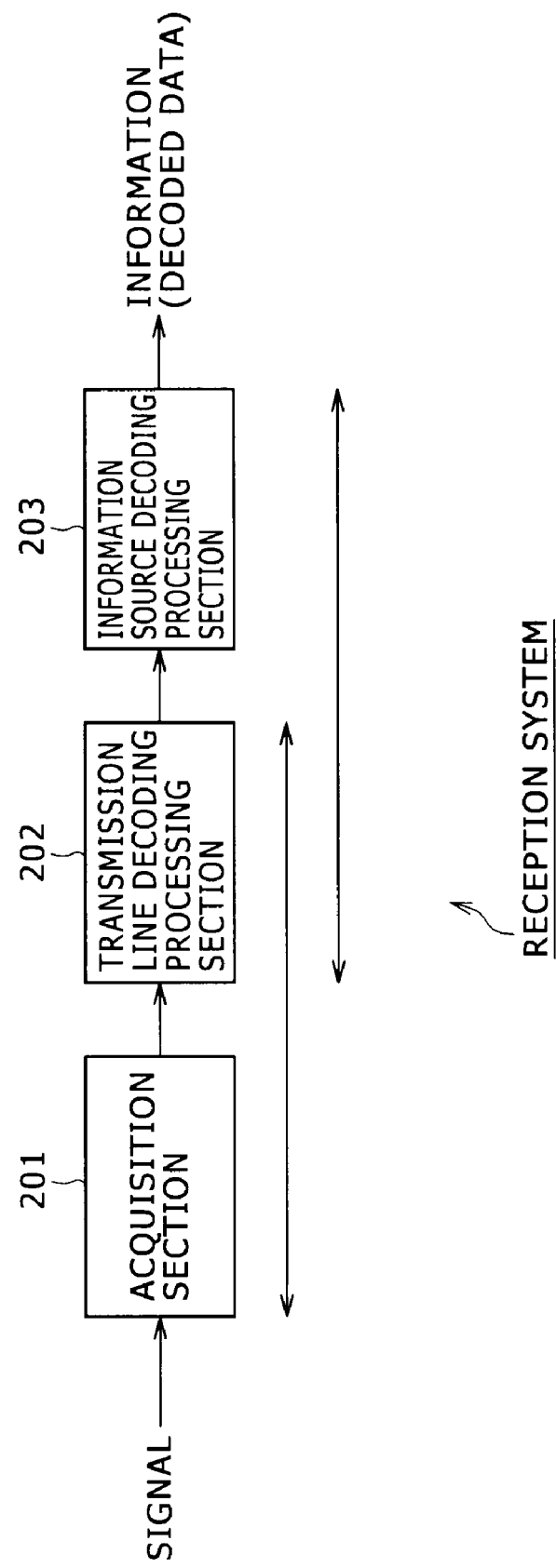

FIG. 20 shows an example of a configuration of a form of a reception system to which the reception apparatus of the embodiments of the present invention is applied.

Referring to FIG. 20, the reception system shown includes an acquisition section 201, a transmission line decoding processing section 202 and an information source decoding processing section 203.

The acquisition section 201 acquires a signal through a transmission line such as a terrestrial digital broadcast, a satellite digital broadcast, a CATV network, the Internet or some other network and supplies the acquired signal to the transmission line decoding processing section 202.

The transmission line decoding processing section 202 carries out a transmission line decoding process including error correction for the signal acquired through the transmission line by the acquisition section 201, and supplies a resulting signal to the information source decoding processing section 203. The reception apparatus 51 shown in FIG. 7 is included in the transmission line decoding processing section 202.

The information source decoding processing section 203 decompresses the signal, after the transmission line decoding process is carried out therefor, to decompress the compressed information into original information and carries out an information source decoding process including a process for acquiring data of a transmission object.

In particular, the signal acquired through the transmission line by the acquisition section 201 is sometimes in a compressed coded state in which information is compressed in order to decrease the data amount of image data, sound data and other data. In this instance, the information source decoding processing section 203 carries out, for the signal for which the transmission line decoding process is carried out, an information source decoding process such as a process for decompressing the compressed information into original information.

It is to be noted that, if the signal acquired through the transmission line by the acquisition section 201 is not in a compressed coded state, then the information source decoding processing section 203 does not carry out the process of decompressing compressed information into original information. Here, the decompression process may be, for example, MPEG decoding. Meanwhile, the information source decoding process may include descramble and so forth in addition to the decompression process.

The reception system of FIG. 20 can be applied, for example, to a television tuner for receiving a digital television broadcast and so forth. It is to be noted that each of the acquisition section 201, transmission line decoding processing section 202 and information source decoding processing section 203 can be configured as a single independent apparatus such as a hardware element such as an IC (Integrated Circuit) or a software module.

Further, the acquisition section 201, transmission line decoding processing section 202 and information source decoding processing section 203 can be configured collectively as a single independent apparatus. Also it is possible to configure the acquisition section 201 and the transmission line decoding processing section 202 collectively as a single independent apparatus, and also it is possible to configure the transmission line decoding processing section 202 and the information source decoding processing section 203 collectively as a single independent apparatus.

Figure 21:
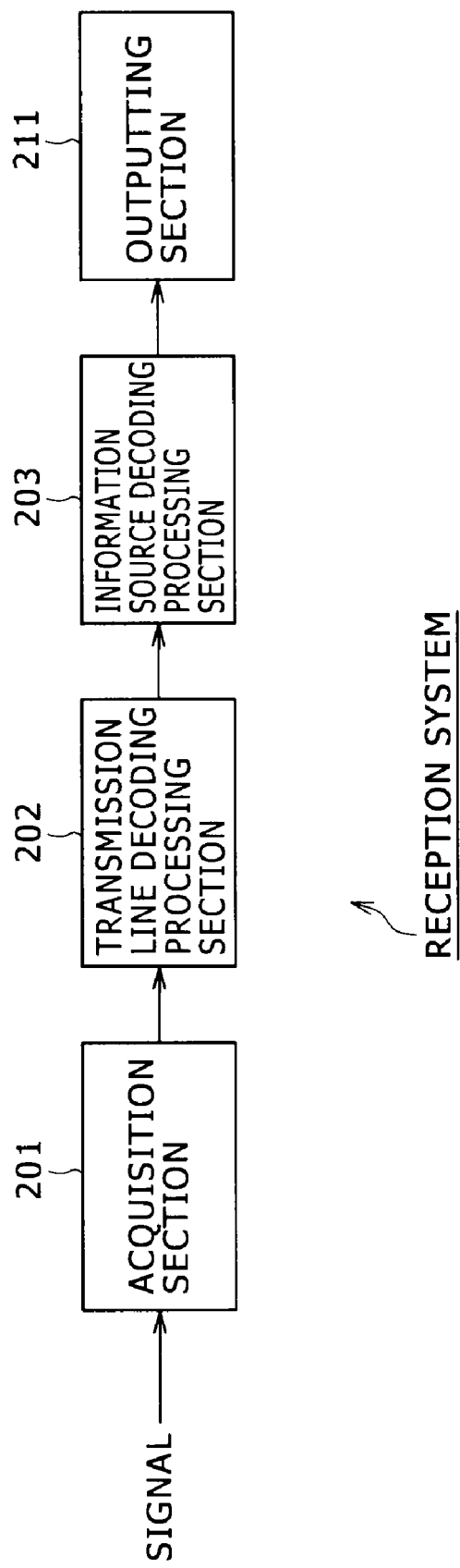

FIG. 21 shows an example of a configuration of a second form of a reception system to which the reception apparatus of the embodiments of the present invention is applied.

In the configuration shown in FIG. 21, the configuration corresponding to the configuration shown in FIG. 20 is denoted by the same reference, and the overlapping description will be omitted appropriately.

The reception system of FIG. 21 is similar to the reception system of FIG. 20 in that it includes an acquisition section 201, a transmission line decoding processing section 202 and an information source decoding processing section 203, but is different in that it additionally includes an outputting section 211.

The outputting section 211 may include, for example, a display apparatus for displaying an image and/or a speaker for outputting sound, and outputs an image, sound or the like based on a signal outputted from the information source decoding processing section 203. In other words, the outputting section 211 displays an image or outputs sound.

The reception system of FIG. 21 can be applied for example, to a television set for receiving a television broadcast as a digital broadcast, a radio receiver for receiving a radio broadcast and so forth.

It is to be noted that, if a signal acquired by the acquisition section 201 is not in a compressed coded state, then a signal outputted from the transmission line decoding processing section 202 is supplied directly to the outputting section 211.

FIG. 22 shows an example of a configuration of a third form of a reception system to which the reception apparatus of the embodiments of the present invention is applied.

In the configuration shown in FIG. 22, the configuration corresponding to the configuration shown in FIG. 20 is denoted by the same reference, and the overlapping description will be omitted appropriately.

Referring to FIG. 22, the reception system shown is similar in configuration to the reception system of FIG. 20 in that it includes an acquisition section 201 and a transmission line decoding processing section 202, but is different in that it does not include the information source decoding processing section 203 but additionally includes a recording section 221.

The recording section 221 records a signal outputted from the transmission line decoding processing section 202 such as, for example, a TS packet of a TS of MPEG on or into a recording or storage medium such as an optical disk, a hard disk or magnetic disk or a flash memory.

The reception system of FIG. 22 having such a configuration as described above can be applied, for example, to a recorder apparatus for recording a television broadcast and so forth.

It is to be noted that the reception system of FIG. 22 may additionally include the information source decoding processing section 203 such that a signal after an information source decoding process is applied by the information source decoding processing section 203, that is, an image or sound obtained by decoding, may be recorded by the recording section 221.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use.

FIG. 23 shows an example of a configuration of a computer which executes the series of processes described hereinabove in accordance with a program.

Referring to FIG. 23, a central processing unit (CPU) 251, a read only memory (ROM) 252 and a random access memory (RAM) 253 are connected to one another by a bus 254.

Further, an input/output interface 255 is connected to the bus 254. An inputting section 256 including a keyboard, a mouse and so forth and an outputting section 257 including a display unit, a speaker and so forth are connected to the input/output interface 255. A storage section 258 formed from a hard disk, a nonvolatile memory or the like, a communication section 259 formed from a network interface and so forth and a drive 260 for driving a removable medium 261 are connected to the input/output interface 255.

In the computer configured in such a manner as described above, the CPU 251 loads, for example, a program recorded in the recording section 258 into the RAM 253 through the input/output interface 255 and the bus 254 and then executes the program to carry out the series of processes described above.

A program to be executed by the CPU 251 is, for example, recorded on and provided together with the removable medium 261 or provided through a wired or wireless transmission medium such as a local network area, the Internet or a digital broadcast, and is installed into the recording section 258.

It is to be noted that a program to be executed by the computer may be a program whose processing is carried out in time series in accordance with the order described herein or may be a program whose processing is carried out in parallel or carried out at a necessary timing such as when it is called.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2009-247756 filed in the Japan Patent Office on Oct. 28, 2009, the entire content of which is hereby incorporated by reference.

What is claimed is:

1. A reception apparatus, comprising:
first acquisition means for receiving a signal which includes at least one of a first signal and a second signal which have different structures from each other except that the first and second signals have a preamble signal and acquiring the preamble signal from the received signal;
detection means for detecting a value for correcting the signal using the signal; and
correction means for correcting, if it is decided based on the preamble signal acquired by said first acquisition means that the signal is the first signal, the signal using the value detected by said detection means.

2. The reception apparatus according to claim 1, wherein said correction means abandons the value detected by said detection means where it is decided based on the preamble signal acquired by said first acquisition means that the signal is not the first signal.

3. The reception apparatus according to claim 2, wherein said correction means corrects, where it is decided that the signal is the first signal, the signal using the value detected by said detection means before a next preamble signal is acquired by said first acquisition means, but abandons, where it is decided that the signal is not the first signal, the value detected by said detection means before a next preamble signal is acquired by said first acquisition means.

4. The reception apparatus according to claim 3, further comprising:
second acquisition means for acquiring, when the signal is the first signal, a different preamble signal succeeding the preamble signal from the signal; and
processing inhibition means for inhibiting the detection process by said detection means based on information of the second signal included in the different preamble signal acquired by said second acquisition means.

5. The reception apparatus according to claim 4, wherein the information of the second signal is a length of and a distance between intervals of the second signal of the signal.

6. The reception apparatus according to claim 1, wherein said detection means detects a fine carrier displacement amount based on a guard interval correlation included in the signal, a fine carrier displacement amount based on a pilot signal included in the signal, or a coarse carrier displacement amount or else a sampling error amount as the value for correcting the signal.

7. A reception method, comprising the steps of:
receiving a signal which includes at least one of a first signal and a second signal which have different structures from each other except that the first and second signals have a preamble signal and acquiring the preamble signal from the received signal;
detecting a value for correcting the signal using the signal; and
correcting, if it is decided based on the acquired preamble signal that the signal is the first signal, the signal using the detected value.

8. A reception system, comprising:
an acquisition section adapted to acquire a signal through a transmission line; and
a transmission line decoding processing section adapted to carry out a transmission line decoding process including at least a demodulation process for the signal acquired through the transmission line;
the signal acquired through the transmission line including at least one of a first signal and a second signal which have different structures from each other except that the first and second signals have a preamble signal;
said transmission line decoding processing section including
acquisition means for acquiring the preamble signal from the signal,
detection means for detecting a value for correcting the signal using the signal, and
correction means for correcting, if it is decided based on the preamble signal acquired by said acquisition means that the signal is the first signal, the signal using the value detected by said detection means.

9. A reception system, comprising:
a transmission line decoding processing section adapted to carry out a transmission line decoding process including at least a demodulation process for a signal acquired through a transmission line; and
an information source decoding processing section adapted to carry out an information source decoding process including at least a process of decompressing compressed information into original information for the signal for which the transmission line decoding process is carried out;
the signal acquired through the transmission line including at least one of a first signal and a second signal which have different structures from each other except that the first and second signals have a preamble signal;
said transmission line decoding processing section including
  acquisition means for acquiring the preamble signal from the signal,
  detection means for detecting a value for correcting the signal using the signal, and
  correction means for correcting, if it is decided based on the preamble signal acquired by said acquisition means that the signal is the first signal, the signal using the value detected by said detection means.

10. A reception system, comprising:
a transmission line decoding processing section adapted to carry out a transmission line decoding process including at least a demodulation process for a signal acquired through a transmission line; and
an outputting section adapted to output an image or sound based on the signal for which the transmission line decoding process is carried out;
the signal acquired through the transmission line including at least one of a first signal and a second signal which have different structures from each other except that the first and second signals have a preamble signal;
said transmission line decoding processing section including
  acquisition means for acquiring the preamble signal from the signal,
  detection means for detecting a value for correcting the signal using the signal, and
  correction means for correcting, if it is decided based on the preamble signal acquired by said acquisition means that the signal is the first signal, the signal using the value detected by said detection means.

11. A reception system, comprising:
a transmission line decoding processing section adapted to carry out a transmission line decoding process including at least a demodulation process for a signal acquired through a transmission line; and
a recording section adapted to record the signal for which the transmission line decoding process is carried out;
the signal acquired through the transmission line including at least one of a first signal and a second signal which have different structures from each other except that the first and second signals have a preamble signal;
said transmission line decoding processing section including
  acquisition means for acquiring the preamble signal from the signal,
  detection means for detecting a value for correcting the signal using the signal, and
  correction means for correcting, if it is decided based on the preamble signal acquired by said acquisition means that the signal is the first signal, the signal using the value detected by said detection means.

12. A reception apparatus, comprising:
an acquisition section adapted to receive a signal which includes at least one of a first signal and a second signal which have different structures from each other except that the first and second signals have a preamble signal and acquire the preamble signal from the received signal;
a detection section adapted to detect a value for correcting the signal using the signal; and
a correction section adapted to correct, if it is decided based on the preamble signal acquired by said acquisition section that the signal is the first signal, the signal using the value detected by said detection section.

13. A reception system, comprising:
acquisition means for acquiring a signal through a transmission line; and
transmission line decoding processing means for carrying out a transmission line decoding process including at least a demodulation process for the signal acquired through the transmission line;
the signal acquired through the transmission line including at least one of a first signal and a second signal which have different structures from each other except that the first and second signals have a preamble signal;
said transmission line decoding processing means including
  acquisition means for acquiring the preamble signal from the signal,
  detection means for detecting a value for correcting the signal using the signal, and
  correction means for correcting, if it is decided based on the preamble signal acquired by said acquisition means that the signal is the first signal, the signal using the value detected by said detection means.

14. A reception system, comprising:
transmission line decoding processing means for carrying out a transmission line decoding process including at least a demodulation process for a signal acquired through a transmission line; and
information source decoding processing for carrying out an information source decoding process including at least a process of decompressing compressed information into original information for the signal for which the transmission line decoding process is carried out;
the signal acquired through the transmission line including at least one of a first signal and a second signal which have different structures from each other except that the first and second signals have a preamble signal;
said transmission line decoding processing means including
  acquisition means for acquiring the preamble signal from the signal,
  detection means for detecting a value for correcting the signal using the signal, and
  correction means for correcting, if it is decided based on the preamble signal acquired by said acquisition means that the signal is the first signal, the signal using the value detected by said detection means.

15. A reception system, comprising:
transmission line decoding processing means for carrying out a transmission line decoding process including at least a demodulation process for a signal acquired through a transmission line; and outputting means for outputting an image or sound based on the signal for which the transmission line decoding process is carried out;

the signal acquired through the transmission line including at least one of a first signal and a second signal which have different structures from each other except that the first and second signals have a preamble signal;

said transmission line decoding processing means including acquisition means for acquiring the preamble signal from the signal, detection means for detecting a value for correcting the signal using the signal, and correction means for correcting, if it is decided based on the preamble signal acquired by said acquisition means that the signal is the first signal, the signal using the value detected by said detection means.

16. A reception system, comprising:

transmission line decoding processing means for carrying out a transmission line decoding process including at least a demodulation process for a signal acquired through a transmission line; and recording means for recording the signal for which the transmission line decoding process is carried out;

the signal acquired through the transmission line including at least one of a first signal and a second signal which have different structures from each other except that the first and second signals have a preamble signal;

said transmission line decoding processing means including acquisition means for acquiring the preamble signal from the signal, detection means for detecting a value for correcting the signal using the signal, and correction means for correcting, if it is decided based on the preamble signal acquired by said acquisition means that the signal is the first signal, the signal using the value detected by said detection means.

* * * * *